United States Patent
Kulkarni et al.

(10) Patent No.: US 9,527,933 B2
(45) Date of Patent: Dec. 27, 2016

(54) BRANCHED POLYETHYLENES BY HYDROSILATION GRAFTING TO IMPROVE PROCESSABILITY OF POLYETHYLENE

(71) Applicant: ExxonMobil Chemical Patents Inc., Baytown, TX (US)

(72) Inventors: Rahul R. Kulkarni, Houston, TX (US); Pradeep P. Shirodkar, Houston, TX (US); Jianya Cheng, Kingwood, TX (US); Donna J. Crowther, Seabrook, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 0 days.

(21) Appl. No.: 14/031,348

(22) Filed: Sep. 19, 2013

(65) Prior Publication Data

US 2014/0088213 A1 Mar. 27, 2014

Related U.S. Application Data

(60) Provisional application No. 61/704,611, filed on Sep. 24, 2012.

(51) Int. Cl.
*C08F 10/02* (2006.01)
*C08F 4/80* (2006.01)
*C08F 4/659* (2006.01)

(52) U.S. Cl.
CPC ............. *C08F 4/80* (2013.01); *C08F 10/02* (2013.01); *C08F 4/65908* (2013.01); *C08F 4/65912* (2013.01)

(58) Field of Classification Search
CPC ......... C08F 10/02; C08F 4/80; C08F 4/65908; C08F 4/65912
See application file for complete search history.

(56) References Cited

U.S. PATENT DOCUMENTS

| | | |
|---|---|---|
| 4,110,377 A | 8/1978 | Clerici et al. |
| 5,493,041 A | 2/1996 | Biggs et al. |
| 6,084,030 A | 7/2000 | Janssen et al. |
| 6,114,445 A | 9/2000 | Tzoganakis et al. |
| 7,247,385 B1 | 7/2007 | Tzoganakis et al. |
| 7,943,719 B2 | 5/2011 | Hawker et al. |
| 8,283,419 B2 | 10/2012 | Hagadorn et al. |
| 8,372,930 B2 | 2/2013 | Brant et al. |
| 8,399,725 B2 | 3/2013 | Brant et al. |
| 8,501,894 B2 | 8/2013 | Crowther et al. |
| 2010/0004393 A1* | 1/2010 | Ikenaga .......... B32B 1/02 525/55 |
| 2010/0168309 A1 | 7/2010 | Mackinnon et al. |
| 2012/0029099 A1 | 2/2012 | Hsieh et al. |
| 2012/0245293 A1 | 9/2012 | Crowther et al. |

FOREIGN PATENT DOCUMENTS

| | | |
|---|---|---|
| EP | 0 802 216 | 10/1997 |
| WO | 98/33842 | 8/1998 |

OTHER PUBLICATIONS

Amin, Smruti B., et al., "Versatile Pathways for In Situ Polyolefin Functionalization with Heteroatoms: Catalytic Chain Transfer", Angew. Chem. Int. Ed., 2008, 47, pp. 2006-2025.
Cancouet, P., et al. "Functional Polysiloxanes. II. Neighboring Effect in the Hydrosilylation of Poly(hydrogenmethylsiloxane-co-dimethylsiloxane)s by Allylglycidylether", Journal of Polymer Science: Part A: Polymer Chemistry, vol. 38, pp. 837-845 (2000).
Chung, T.C., "Synthesis of functional polyolefin copolymers with graft and block structures", Prog. Polym. Sci., 27, 2002, pp. 39-85.
Clerici, Mario G., et al., "Catalytic C-Alkylation of Secondary Amines with Alkenes", Synthesis Comm., 1980, 4, pp. 305-306.
Eisenberger, Patrick, et al., "Tantalum-Amidate Complexes for the Hydroaminoalkylation of Secondary Amines: Enhanced Substrate Scope and Enantioselective Chiral Amine Synthesis", Angew. Chem. Int. Ed., 2009, 48, pp. 8361-8365.
Herzon, Seth B., et al., "Hydroaminoalkylation of Unactivated Olefins with Dialkylamines", J. Am. Chem. Soc., 2008, 130, pp. 14940-14941.
Herzon, Seth B., et al., "Direct, Catalytic Hydroaminoalkylation of Unactivated Olefins with N-Alkyl Arylamines", J. Am. Chem. Soc., 2007, 129, pp. 6690-6691.
Kubiak, Raphael, et al., "Titanium-Catalyzed Hydroaminoalkylation of Alkenes by C—H Bond Activation at sp3 Centers in the α-Position to a Nitrogen Atom", Angew. Chem. Int. Ed., 2009, 48, pp. 1153-1156.
Lopez, Ricardo Godoy, et al., "Synthesis of well-defined polymer architectures by successive catalytic olefin polymerization and living/controlled polymerization reactions", Prog. Polym. Sci., 32, 2007, pp. 419-454.
Roesky, Peter W., "Catalytic Hydroaminoalkylation", Angew. Chem. Int. Ed., 2009, 48, 4892-4894.
Seayad, Abdul Majeed, et al., "Hydroaminomethylation of olefins using a rhodium carbine catalyst", Tetrahedron Letters, 44, 2003, pp. 1679-1683.
Segawa, Yasutomo, "Catalytic Hydroaminoalkylation of Alkenes", Yuki Gosei Kagaku Kyokaishi, 2009, 67(8), pp. 843-844.
Moad, G., "*The synthesis of polyolefin graft copolymers by reactive extrusion*," Prog. Polym. Sci., vol. 24, 1999, pp. 81-142.

* cited by examiner

*Primary Examiner* — Irina S Zemel
*Assistant Examiner* — Jeffrey Lenihan
(74) *Attorney, Agent, or Firm* — Priya G. Prasad; Kevin M. Faulkner

(57) ABSTRACT

This invention relates to blends of polyalphaolefins (PAOs) and polyhydrosilane-modified polyolefins, methods to prepare the blends and methods to prepare polyhydrosilane-modified polyolefins.

11 Claims, 3 Drawing Sheets

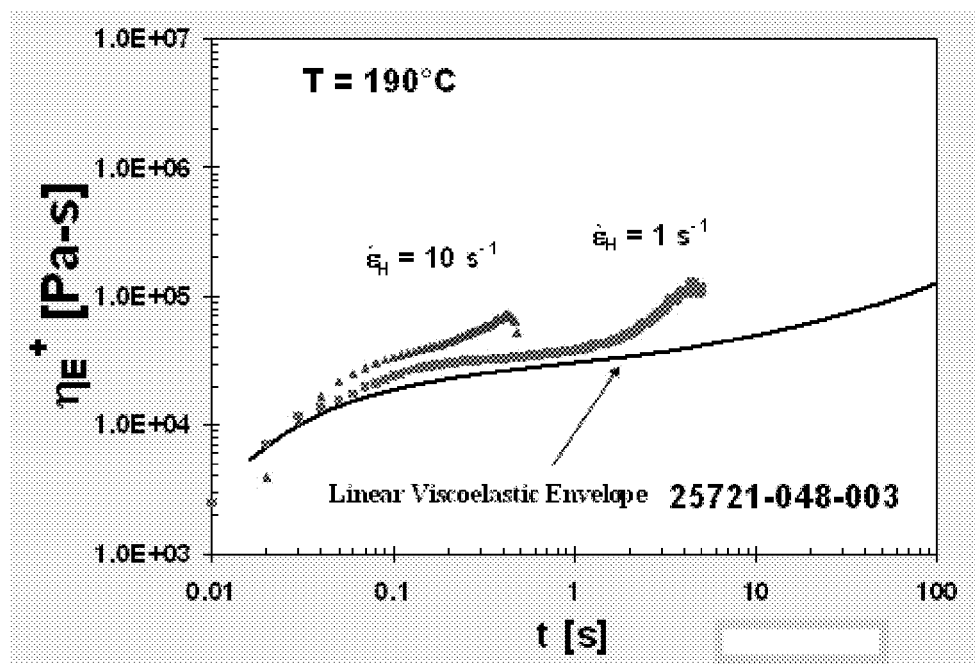
Figure 1. Example 2 Extensional Rheology Plot

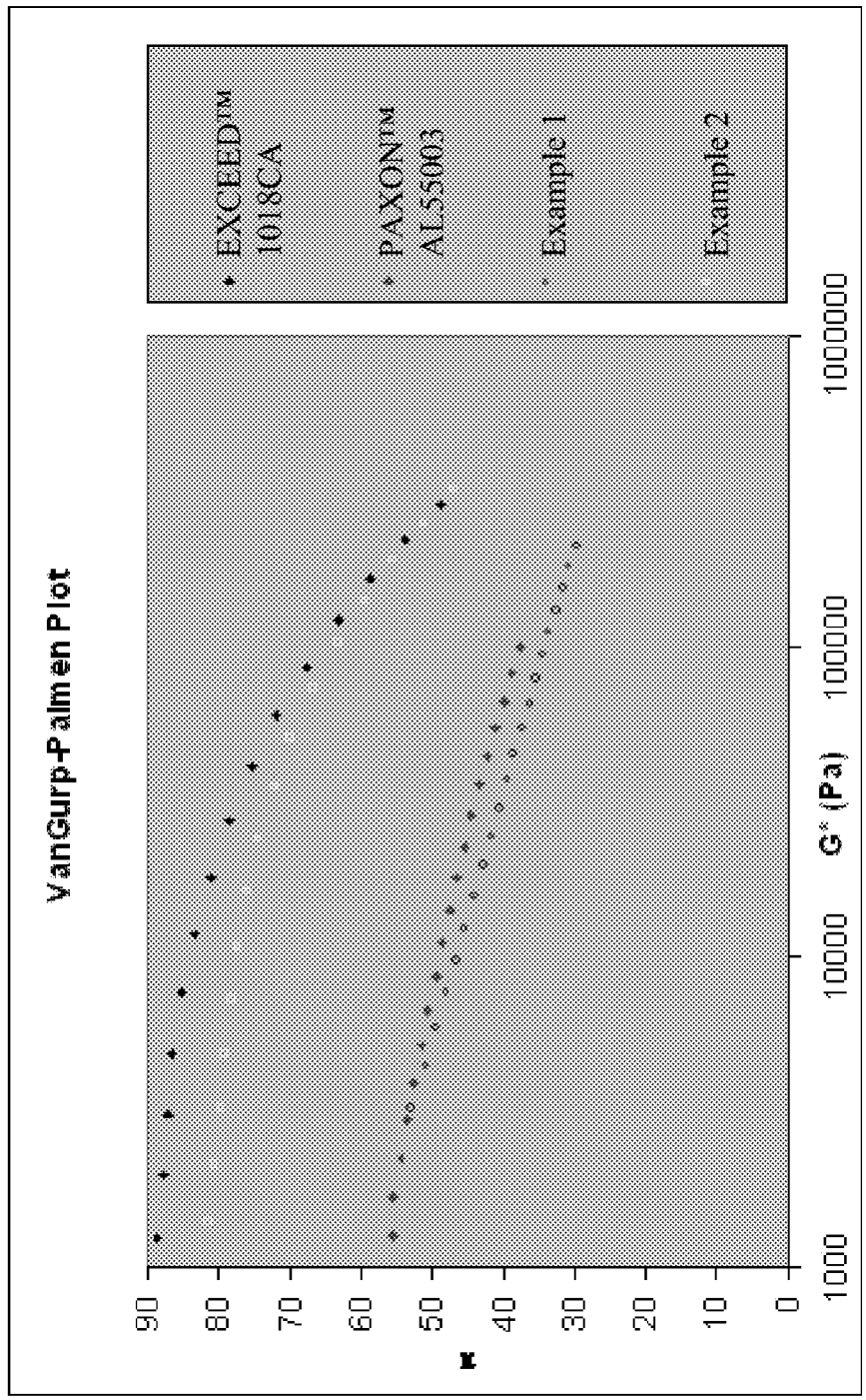
Figure 2. VanGurp-Palmen Plot for Example modified polyolefins and their comparison with raw materials.

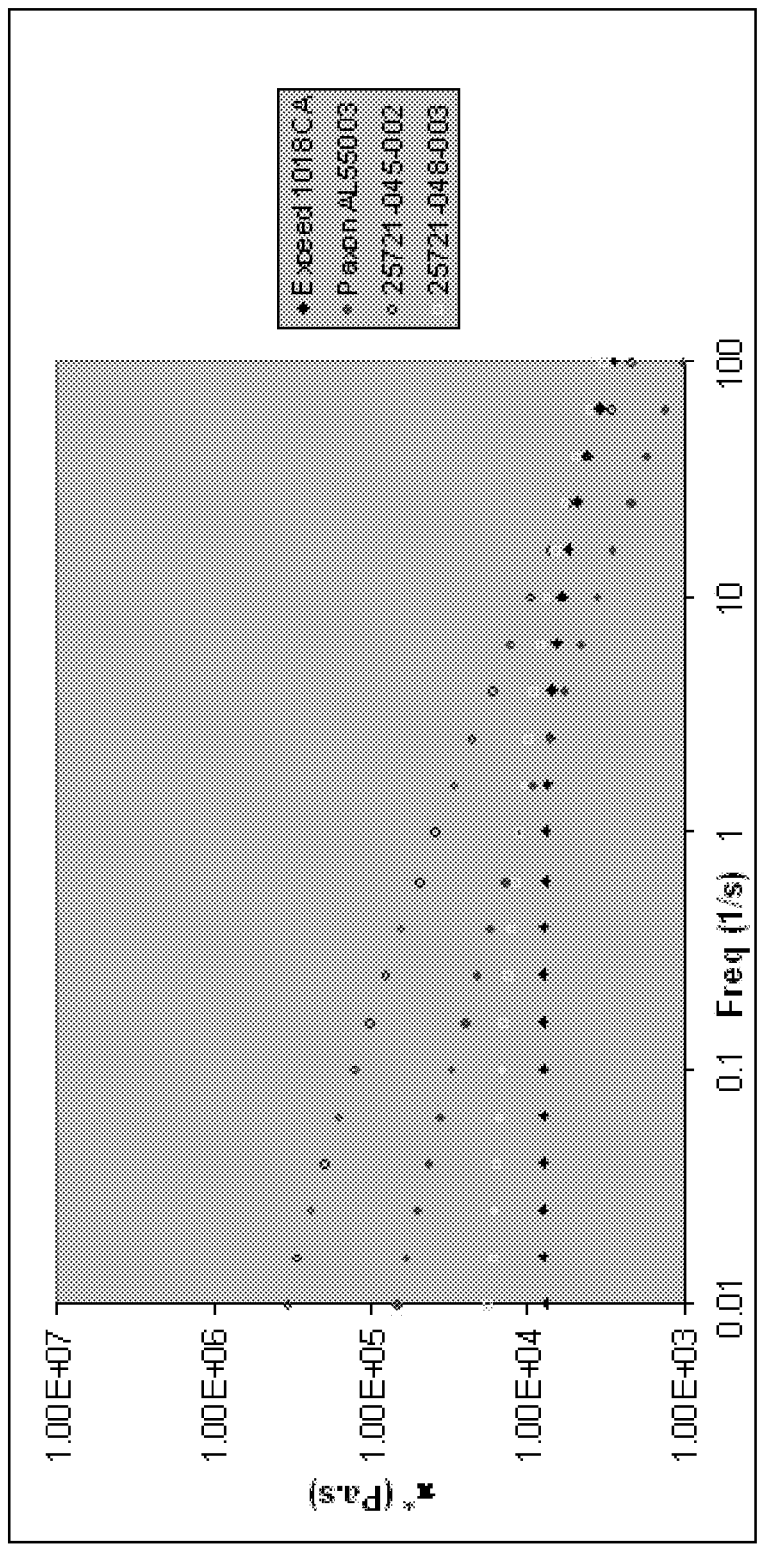
Figure 3. Complex Viscosity vs. Frequency plot for example graft copolymers and their comparison with raw materials.

BRANCHED POLYETHYLENES BY HYDROSILATION GRAFTING TO IMPROVE PROCESSABILITY OF POLYETHYLENE

CROSS REFERENCE TO RELATED APPLICATIONS

This application claims priority to and the benefit of U.S. Provisional Application No. 61/704,611, filed Sep. 24, 2012, the disclosure of which is incorporated herein by reference in its entirety. This application also relates to U.S. Application Ser. No. 61/704,606 filed on Sep. 24, 2012; and U.S. Application Ser. No. 61/704,604 filed on Sep. 24, 2012.

FIELD OF THE INVENTION

This invention relates to coupling of vinyl terminated polyolefins with a polysilane or a polysiloxane in the presence of a non-metallocene catalyst.

BACKGROUND OF THE INVENTION

Methods for the production of polyolefins with end-functionalized groups are typically multi-step processes that often create unwanted by-products and waste of reactants and energy. For reviews of methods to form end-functionalized polyolefins, see: S. B. Amin and T. J. Marks, *Angew. Chem. Int. Ed.* 2008, 47, pp. 2006-2025; T. C. Chung, *Prog. Polym. Sci.* 2002, 27, pp. 39-85; and R. G. Lopez, F. D'Agosto, C. Boisson, *Prog. Polym. Sci.* 2007, 32, pp. 419-454. A process with a reduced number of steps would be desirable.

U.S. Pat. No. 4,110,377 discloses secondary aliphatic amines alkylated with alpha-olefins, such as ethylene, propylene, hexene, and undecene. Likewise, several literature references disclose hydroaminoalkylation of olefins using various catalysts (see J. Am. Chem. Soc. 2008, 130, pp. 14940-14941; J. Am. Chem. Soc. 2007, 129, pp. 6690-6691; Angew. Chem. Int. Ed. 2009, 48, pp. 8361-8365; Angew. Chem. Int. Ed. 2009, 48, pp. 4892-4894; Yuki Gosei Kagaku Kyokaishi (2009), 67(8), pp. 843-844; Angewandte Chemie, International Edition (2009), 48(6), pp. 1153-1156; Tetrahedron Letters (2003), 44(8), pp. 1679-1683; and Synthesis (1980), (4), pp. 305-306.

WO 98/33842 discloses the production of branched polyolefins comprising a silicon containing polymeric backbone with branches extending therefrom in which the branches are formed of polyolefins wherein the branched polymers are produced by a hydrosilation reaction between the polyolefin prearms with a hydrosilane containing group.

U.S. Pat. No. 6,084,030 discloses branched polyolefin polymers in the form of a comb, star, nanogel, and structural combinations thereof comprising a plurality of polyolefin arms selected from the group consisting of (1) polymers of ethylene; (2) polymers of propylene; and (3) copolymers of ethylene with one or more 1-alkenes, said arms being linked to the polymeric backbone, wherein the reactive polymeric backbone is formed from a siloxane, and said backbone contains at least 4-300 polyolefin arms, and said branched polyolefin polymer is prepared by coupling the polyolefin prearms with said polymeric backbone.

U.S. Pat. No. 8,399,725 discloses certain vinyl terminated oligomers and polymers that are functionalized for use in lubricant applications.

U.S. Pat. No. 8,372,930 discloses certain vinyl terminated oligomers and polymers that are functionalized in U.S. Pat. No. 8,399,725.

U.S. Pat. No. 8,283,419 discloses a process to functionalize propylene homo- or co-oligomer comprising contacting an alkene metathesis catalyst with a heteroatom containing alkene and a propylene homo- or co-oligomer having terminal unsaturation.

U.S. Pat. No. 8,501,894 discloses a process to functionalize polyolefins comprising contacting a metallocene catalyst with a hydrosilane, and one or more vinyl terminated polyolefins. This invention further relates to the hydrosilane-functionalized polyolefins produced thereby.

U.S. Publication No. 2012-0245293 discloses a process to functionalize polyolefins comprising contacting a metallocene catalyst with a difunctional diblock hydrosilane, and one or more vinyl terminated polyolefins. This invention further relates to the diblock hydrosilane-functionalized polyolefins produced thereby.

End-functionalized polyolefins that feature a chemically reactive or polar end group are of interest for use in a broad range of applications as compatibilizers, tie-layer modifiers, surfactants, and surface modifiers.

Thus, there is an ongoing need to develop a means to provide functionalized polyolefins with different polymeric architectures by efficient reactions, particularly reactions with good conversion, preferably under mild reaction conditions with a minimal number of steps, preferably one or two steps, preferably without solvent.

SUMMARY OF THE INVENTION

This invention relates to a modified polyolefin represented by the formula:

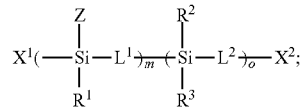

wherein:
Z is a group represented by the formula:

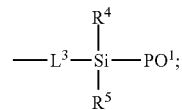

wherein $PO^1$ is a substituted or unsubstituted hydrocarbyl group having from 20 to about 10,000 carbon atoms;
$R^1$ is Z, hydrogen, a $C_1$ to a $C_{20}$ substituted or unsubstituted hydrocarbyl group, or $PO^4$, wherein $PO^4$ is a substituted or unsubstituted hydrocarbyl group having from 20 to about 10,000 carbon atoms;
each $R^2$, $R^3$, $R^4$, and $R^5$, independently, is hydrogen, a $C_1$ to a $C_j$ substituted or unsubstituted hydrocarbyl group, wherein $R^2$ and $R^3$ and/or $R^4$ and $R^5$ may form a cyclic structure with Si, or, a $PO^4$;
each $L^1$, $L^2$, and $L^3$, independently, is a bond or a linking group;
m is an integer from 1 to 1000;
o is an integer from 0 to 1000; and
$X^1$ and $X^2$, each independently, is hydrogen, a $C_1$ to a $C_{20}$ substituted or unsubstituted hydrocarbyl group, or a $PO^4$;
wherein each $PO^1$ and $PO^4$ may be the same or different.

This invention also relates to modified polyolefin represented by the formula:

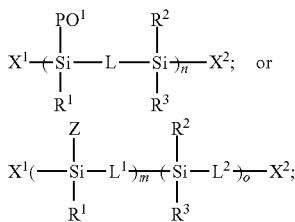

wherein:
Z is a group represented by the formula:

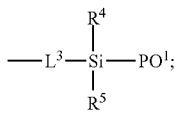

wherein $PO^1$ is a substituted or unsubstituted hydrocarbyl group having from 20 to about 10,000 carbon atoms derived from a vinyl terminated macromonomer;
each $R^1$, $R^2$, $R^3$, $R^4$, and $R^5$, independently, is hydrogen, a $C_1$ to a $C_{20}$ substituted or unsubstituted hydrocarbyl group, where $R^2$ and $R^3$ may form a cyclic structure with Si, or a $PO^4$, wherein $PO^4$ is a substituted or unsubstituted hydrocarbyl group having from 20 to about 10,000 carbon atoms derived from a vinyl terminated macromonomer;
each L, $L^1$, $L^2$, and $L^3$, is a bond or a linking group;
m is an integer from 1 to 1000;
n is an integer from 1 to 1000;
o is an integer from 0 to 1000; and
$X^1$ and $X^2$, each independently, is hydrogen, a $C_1$ to a $C_{20}$ substituted or unsubstituted hydrocarbyl group, or a $PO^4$;
wherein each $PO^1$ and $PO^4$ may be the same or different.

This invention further relates to a process to prepare a modified polyolefin comprising the steps of:
(i) contacting a non-metallocene catalyst, a hydrosilylation modifier, and one or more vinyl terminated polyolefin selected from a vinyl terminated polyalphaolefin and a vinyl terminated macromonomer;
wherein when the vinyl terminated polyolefin is a vinyl terminated macromonomer, the hydrosilylation modifier is represented by one of more of the formulae:

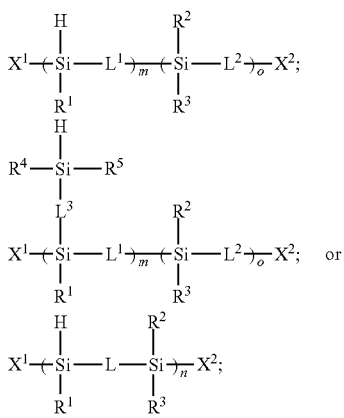

and
wherein when the vinyl terminated polyolefin is a vinyl terminated polyalphaolefin, the hydrosilylation modifier is represented by the formula:

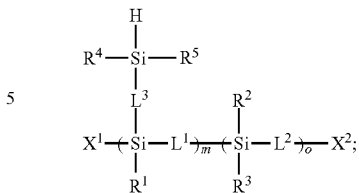

wherein $R^1$ is hydrogen, Z', or a $C_1$ to a $C_{20}$ substituted or unsubstituted hydrocarbyl group;
wherein Z' is a group represented by the formula:

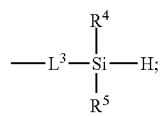

each $R^2$, $R^3$, $R^4$, and $R^5$, independently, is hydrogen, or a $C_1$ to a $C_{20}$ substituted or unsubstituted hydrocarbyl group, where $R^2$ and $R^3$ and/or $R^4$ and $R^5$ may form a cyclic structure with Si;
each L, $L^1$, $L^2$, and $L^3$, independently, is a bond or a linking group;
m is an integer from 1 to 1000;
n is an integer from 1 to 1000;
o is an integer from 0 to 1000;
each of $X^1$ and $X^2$, independently, is hydrogen or a $C_1$ to a $C_{20}$ substituted or unsubstituted hydrocarbyl group;
wherein the vinyl terminated polyolefin is a substituted or unsubstituted hydrocarbyl group having from 20 to about 10,000 carbon atoms and at least 5% allyl chain ends; and
(ii) obtaining a modified polyolefin.

BRIEF DESCRIPTION OF THE FIGURES

FIG. 1 depicts an extensional rheology plot for Example 2 comparative modified polymers.
FIG. 2 is a VanGurp-Palmen Plot for Example 2 comparative modified copolymers and their comparison with raw materials.
FIG. 3 provides a complex viscosity vs. frequency plot for Example 2 comparative modified copolymers and their comparison with raw materials.

DETAILED DESCRIPTION

This invention is related to polyolefins modified by hydrosilylation. Methods of producing these modified polyolefins are also disclosed. Articles comprising these modified polyolefins are also within the scope of this invention.

In particular embodiments, the present invention relates to ethylene-based hydrosilylated polyolefins and blends thereof, especially for blown film applications. Films made using conventional high density polyethylene typically have low processability and often tend to have gels. The low processability of these HDPE polymers coupled with the undesirable gel formation affects bubble stability in blown film processes. Current attempts to improve this involve adding LDPE at low loadings, typically at around 5 wt %; however, this generally leads to an undesirable decrease in mechanical properties such as dart drop strength, bubble stability, and tear properties.

The inventors have surprisingly found that blends of the hydrosilylated polyolefins disclosed herein with HDPE, even at lower loadings than traditionally used for LDPE, demonstrated improved processability without the same sacrifice of desirable properties such as haze, internal haze, and desired mechanical properties. This provides a cost advantage as less of the modified polyolefin is needed. The inventive processes to produce these modified polyolefins, the modified polyolefins, and applications for their use are described, in turn, below.

Definitions

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to, ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

"Higher olefin," as used herein, means $C_4$ to $C_{40}$ olefins; preferably, $C_5$ to $C_{30}$ alpha-olefins; more preferably, $C_5$ to $C_{20}$ alpha-olefins; or even more preferably, $C_5$ to $C_{12}$ alpha-olefins. A "higher olefin copolymer" is a polymer comprising two or more different monomer units (where different means the monomer units differ by at least one atom or are different isomerically), at least one of which is a higher olefin monomer unit.

A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. For purposes herein, a "polymer chain" or "polymeric chain" comprises a concatenation of carbon atoms bonded to each other in a linear or a branched chain, which is referred to herein as the backbone of the polymer (e.g., polyethylene). The polymeric chain may further comprise various pendent groups attached to the polymer backbone which were present on the monomers from which the polymer was produced. These pendent groups are not to be confused with branching of the polymer backbone, the difference between pendent side chains and both short and long chain branching being readily understood by one of skill in the art.

An "oligomer" is a polymer having a low molecular weight. In some embodiments, an oligomer has a Mn of 21,000 g/mol or less (e.g., 2,500 g/mol or less); in other embodiments, an oligomer has a low number of mer units (such as 75 mer units or less).

An "alpha-olefin" is an olefin having a double bond at the alpha (or 1-) position, and for purposes of this invention, includes ethylene. A "linear alpha-olefin" or "LAO" is an olefin with a double bond at the alpha position and a linear hydrocarbon chain. A "polyalphaolefin" or "PAO" is a polymer comprising alpha-olefins. For the purposes of this disclosure, the term "α-olefin" includes $C_2$ to $C_{20}$ olefins. Non-limiting examples of α-olefins include ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptade-cene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane.

The term "substituted" means that a hydrogen group has been replaced with a hydrocarbyl group, a heteroatom, or a heteroatom containing group. For example, methyl cyclopentadiene (Cp) is a Cp group substituted with a methyl group and ethyl alcohol is an ethyl group substituted with an —OH group.

An "ethylene polymer" is a polymer having at least 50 mol % ethylene, a "propylene polymer" is a polymer having at least 50 mol % of propylene, and so on.

A "thermoplastic polymer" is a polymer that can be melted by heat and then cooled without appreciable change in properties. Thermoplastic polymers typically include, but are not limited to, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Preferred polyolefins include, but are not limited to, polymers comprising one or more linear, branched or cyclic $C_2$ to $C_{40}$ olefins, preferably polymers comprising propylene copolymerized with one or more $C_3$ to $C_{40}$ olefins, preferably a $C_3$ to $C_{20}$ alpha-olefin, more preferably $C_3$ to $C_{10}$ alpha-olefins. More preferred polyolefins include, but are not limited to, polymers comprising ethylene including, but not limited to, ethylene copolymerized with a $C_3$ to $C_{40}$ olefin, preferably a $C_3$ to $C_{20}$ alpha-olefin, more preferably propylene and/or butene.

An "elastomer" includes all natural and synthetic rubbers, including those defined in ASTM D1566. Examples of preferred elastomers include, but are not limited to, ethylene propylene rubber, ethylene propylene diene monomer rubber, styrenic block copolymer rubbers (including SI, SIS, SB, SBS, SIBS, and the like, where S=styrene, I=isobutylene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, and polybutadiene rubber (both cis and trans).

As used herein, Mn is number average molecular weight as determined by proton nuclear magnetic resonance spectroscopy ($^1$H NMR) unless stated otherwise, Mw is weight average molecular weight as determined by gel permeation chromatography (GPC), Mz is z average molecular weight as determined by GPC, wt % is weight percent, and mol % is mole percent. Molecular weight distribution (MWD) is defined to be Mw divided by Mn. Unless otherwise noted, all molecular weight units, e.g., Mw, Mn, Mz, are reported in units of g/mol.

For the purposes of this invention and the claims thereto, the new numbering scheme for the Periodic Table Groups is used as set out in CHEMICAL AND ENGINEERING NEWS, 63(5), pg. 27 (1985). Therefore, a "Group 4 metal" is an element from Group 4 of the Periodic Table.

The terms "catalyst" and "catalyst compound" are defined to mean a compound capable of initiating catalysis. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is a combination of at least one catalyst compound, an optional activator, an optional co-activator, and an optional support material, where the system can polymerize monomers to polymer. Typically, a catalyst system comprises at least a catalyst compound and an activator. For the purposes of this invention and the claims thereto, when catalyst systems are described as comprising neutral stable forms of the components, it is well understood by one of ordinary skill in the art, that the ionic form of the component is the form that reacts with the monomers to produce polymers.

The terms "hydrocarbyl radical," "hydrocarbyl," and "hydrocarbyl group" are used interchangeably throughout this document. For purposes of this disclosure, "hydrocarbyl radical" is defined to comprise carbon and hydrogen atoms, and may be linear, branched, or cyclic (aromatic or non-aromatic); and may include substituted hydrocarbyl radicals as defined herein. Likewise, the terms "functional group," "group," and "substituent" are also used interchangeably in this document. In an embodiment, a functional group may comprise a hydrocarbyl radical, a substituted hydrocarbyl radical, or a combination thereof.

"Substituted hydrocarbyl radicals" are radicals in which at least one hydrogen atom has been substituted with a heteroatom or heteroatom containing group, or with atoms from Groups 13, 14, 15, 16, and 17 of the Periodic Table of Elements, or a combination thereof, or with at least one functional group, such as halogen (Cl, Br, I, F), $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one heteroatom has been inserted within the hydrocarbyl radical, such as halogen (Cl, Br, I, F), O, S, Se, Te, $NR^*$, $PR^*$, $AsR^*$, $SbR^*$, $BR^*$, $SiR^*_2$, $GeR^*_2$, $SnR^*_2$, $PbR^*_2$, and the like, where $R^*$ is, independently, hydrogen or a hydrocarbyl radical, or any combination thereof.

In an embodiment, the hydrocarbyl radical is independently selected from methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl. Also included are isomers of saturated, partially unsaturated, and aromatic cyclic structures wherein the radical may additionally be subjected to the types of substitutions described above. Examples include phenyl, methylphenyl, benzyl, methylbenzyl, naphthyl, cyclohexyl, cyclohexenyl, methylcyclohexyl, and the like.

For this disclosure, when a radical is listed, it indicates that radical type and all other radicals formed when that radical type is subjected to the substitutions defined above. Alkyl, alkenyl, and alkynyl radicals listed include all isomers including, where appropriate, cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (analogous substituted cyclobutyls and cyclopropyls); and butenyl includes E and Z forms of 1-butenyl, 2-butenyl, 3-butenyl, 1-methyl-1-prop enyl, 1-methyl-2-propenyl, 2-methyl-1-propenyl, and 2-methyl-2-propenyl (cyclobutenyls and cyclopropenyls). Cyclic compounds having substitutions include all isomer forms, for example, methylphenyl would include ortho-methylphenyl, meta-methylphenyl, and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

All molecular weights are number average unless otherwise noted. All molecular weights are reported in g/mol, unless otherwise noted.

Processes to Produce Modified Polyolefins

Embodiments of this invention relate to processes to prepare a modified polyolefin comprising the steps of:

(i) contacting a non-metallocene catalyst, a hydrosilylation modifier, and one or more vinyl terminated polyolefin selected from a vinyl terminated polyalphaolefin and a vinyl terminated macromonomer;

wherein when the vinyl terminated polyolefin is a vinyl terminated macromonomer, the hydrosilylation modifier is represented by one of more of the formulae:

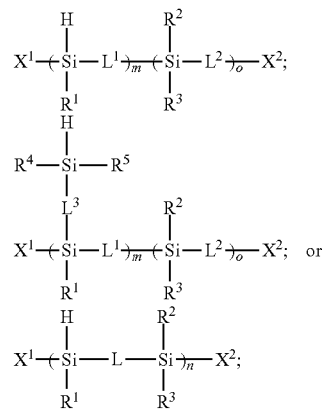

wherein when the vinyl terminated polyolefin is a vinyl terminated polyalphaolefin, the hydrosilylation modifier is represented by the formula:

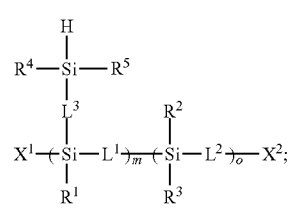

wherein $R^1$ is hydrogen, $Z'$, or a $C_1$ to a $C_{20}$ substituted or unsubstituted hydrocarbyl group; and wherein $Z'$ is a group represented by the formula:

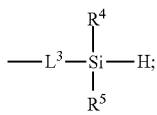

each $R^2$, $R^3$, $R^4$, and $R^5$, independently, is a H, or a $C_1$ to a $C_{20}$ substituted or unsubstituted hydrocarbyl group, where $R^2$ and $R^3$ and/or $R^4$ and $R^5$ may form a cyclic structure with Si;

each L, $L^1$, $L^2$, and $L^3$, independently, is a bond or a linking group;

m is an integer from 1 to 1000;

n is an integer from 1 to 1000;

o is an integer from 0 to 1000;

each of $X^1$ and $X^2$, independently, is hydrogen or a $C_1$ to a $C_{20}$ substituted or unsubstituted hydrocarbyl group;

wherein the vinyl terminated polyolefin is a substituted or unsubstituted hydrocarbyl group having from 20 to about 10,000 carbon atoms and at least 5% allyl chain ends; and (ii) obtaining a modified polyolefin.

Accordingly, this invention relates to a process to modify polyolefins, for example, high density polyethylene (HDPE), comprising contacting a non-metallocene catalyst with a hydrosilylation modifier (typically a polyhydrosilane), and one or more vinyl terminated polyolefins. "Modified polyolefin," "hydrosilylated polyolefin," and "polyhydrosilane-modified polyolefin" may be used interchangeably throughout this disclosure.

Each of the non-metallocene catalyst, the hydrosilylation modifier, and the vinyl terminated polyolefins will be discussed in turn, below. The reactants are typically combined in a reaction zone, such as a BRABENDER™ extruder, mill equipment, a reaction vessel or a stirred tank reactor. Preferably, the process is carried out without the use of a solvent (except the solvent that may be present in the catalyst, if the catalyst used is in a solution formulation). Preferably, the process of this invention occurs in the melt phase. Preferably, the process of this invention occurs in an extruder such as a BRABENDER™ extruder. Preferably, the process occurs at a temperature in the range of from about 60° C. to about 300° C., and more preferably from about 100° C. to about 250° C.

The process may be batch, semi-batch, or continuous. As used herein, the term "continuous" means a system that operates without interruption or cessation. For example, a continuous process to produce a polymer would be one where the reactants are continually introduced into one or more reactors and polymer product is continually withdrawn.

In a preferred embodiment, the productivity of the process is at least 200 g of a hydrosilane-modified polyolefin per mmol of catalyst per hour, preferably at least 5000 g/mmol/hour, preferably at least 10,000 g/mmol/hr, preferably at least 300,000 g/mmol/hr.

This invention further relates to a process, preferably an in-line process, preferably a continuous process, to produce a modified polyolefin, comprising introducing polymer and non-metallocene catalyst into a reactor, obtaining a reactor effluent containing vinyl terminated polyolefin, optionally removing (such as flashing off) any solvent, unused monomer, and/or other volatiles, obtaining vinyl terminated polyolefin (such as those described herein), introducing vinyl terminated polyolefin, non-metallocene catalyst, and hydrosilylation modifier, as described herein, into a reaction zone (such as a reactor, an extruder, a pipe, and/or a pump), and obtaining the modified polyolefin described herein.

Typically, the modified polyolefin is added in small amounts to a base polymer, in order to improve the properties of the blend as compared to the base polymer alone. The base polymer may be comprised of one or more other polymers, including but not limited to, thermoplastic polymer(s) and/or elastomer(s). Accordingly, the process may further comprise: (iii) adding a polymer; and, (iv) obtaining a blend comprising the modified polyolefin. Preferably, the polymer from step (iii) is added during step (i). Alternately, the polymer from step (iii) is added after step (i).

Preferably, the amount of modified polyolefin in the blend is from about 0.5 wt % to about 10.0 wt %, based on the total weight of the blend. Preferably, the amount of modified polyolefin is from about 0.5 wt % to about 5.0 wt %, based on the total weight of the blend. Most preferably, the amount of modified polyolefin is from about 0.5 wt % to about 3.0 wt %, based on the total weight of the blend.

Typically, the amount of base polymer in the blend is from about 90.0 wt % to about 99.5 wt %, based on the total weight of the blend. Preferably, the amount of base polymer is from about 95.0 wt % to about 99.5 wt %, based on the total weight of the blend. Most preferably, the amount of modified polyolefin is from about 97.0 wt % to about 99.5 wt %, based on the total weight of the blend.

Tackifiers may be blended with the polyhydrosilane-modified (and, optionally, derivatized) polyolefins produced herein and/or with blends of the polyhydrosilane-modified (and, optionally, derivatized) polyolefins produced by this invention (as described above). Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments, the tackifier is hydrogenated. In some embodiments, the tackifier has a softening point (Ring and Ball, as measured by ASTM E-28) of 80° C. to 140° C., preferably 100° C. to 130° C. The tackifier, if present, is typically present at about 1 wt % to about 50 wt %, based upon the weight of the blend, more preferably 10 wt % to 40 wt %, even more preferably 20 wt % to 40 wt %.

The polyhydrosilane-modified (and, optionally, derivatized) polyolefins of this invention, and/or blends thereof, may further comprise typical additives known in the art such as fillers, cavitating agents, antioxidants, surfactants, adjuvants, plasticizers, block, antiblock, color masterbatches, pigments, dyes, processing aids, UV stabilizers, neutralizers, lubricants, waxes, and/or nucleating agents. The additives may be present in the typically effective amounts well known in the art, such as from 0.001 wt % to 10 wt %. Preferred fillers, cavitating agents and/or nucleating agents include titanium dioxide, calcium carbonate, barium sulfate, silica, silicon dioxide, carbon black, sand, glass beads, mineral aggregates, talc, clay, and the like. Preferred antioxidants include phenolic antioxidants, such as IRGANOX™ 1010, IRGANOX™ 1076, both available from BASF (Florham Park, N.J.). Preferred oils include paraffinic or naphthenic oils such as Primol 352, or Primol 876 available from ExxonMobil Lubricants and Specialties Europe (Machelen, Belgium). More preferred oils include aliphatic naphthenic oils, white oils, or the like.

Non-Metallocene Catalyst

Suitable non-metallocene catalysts include, for example, chloroplatinic acid, platinum complexes such as platinum cyclovinylmethylsiloxane from Gelest Inc. (Morrisville, Pa.), rhodium complexes, peroxides, for example TRIGONOX-101 from Akzo Nobel (Baton Rouge, La.) and dicumyl peroxide, Ziegler Natta catalysts, and iridium, cobalt, ruthenium, osmium, nickel and palladium complexes.

In particular embodiments, the non-metallocene catalyst is one or more of: platinum-divinyltetramethyldisiloxane complex (in some embodiments, in a solvent such as xylene); platinum-carbonyl-cyclovinylmethylsiloxane complex; platinum-cyclovinylmethylsiloxane complex; platinum-octanal/octanol complex; hexachloroplatinic acid; and dimethylplatinum cyclooctadiene complex; all available from Gelest Inc. (Morrisville, Pa.).

In preferred embodiments, the non-metallocene catalyst is a platinum-cyclovinylmethylsiloxane complex, having the following structure:

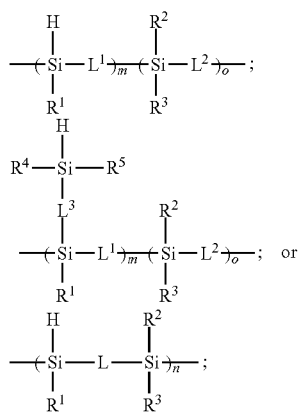

The amount of non-metallocene catalyst used may range from 5 ppm of metal to 1000 ppm. Preferably, the amount of non-metallocene catalyst used ranges from 5 ppm to 25 ppm of metal. For example, 18 ppm platinum of a platinum catalyst may be used.

Hydrosilylation Modifier

The polyolefins are modified in this invention with a hydrosilylation modifier, preferably a polyhydrosilane. In some embodiments, the hydrosilylation modifier is represented by one or more of the following formulae:

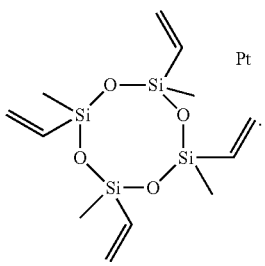

wherein $R^1$ is hydrogen, Z', or a $C_1$ to a $C_{20}$ substituted or unsubstituted hydrocarbyl group; and wherein Z' is a group represented by the formula:

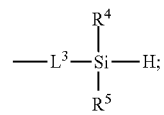

each $R^2$, $R^3$, $R^4$, and $R^5$, independently, is hydrogen, or a $C_1$ to a $C_{20}$ substituted or unsubstituted hydrocarbyl group, where $R^2$ and $R^3$ and/or $R^4$ and $R^5$ may form a cyclic structure with Si;

each L, $L^1$, $L^2$, and $L^3$, independently, is a bond or a linking group;

m is an integer from 1 to 1000;

n is an integer from 1 to 1000; and o is an integer from 0 to 1000.

In preferred embodiments, the hydrosilylation modifier is represented by the following formula:

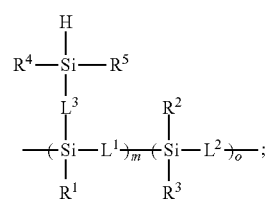

wherein $R^1$ is hydrogen, Z', or a $C_1$ to a $C_{20}$ substituted or unsubstituted hydrocarbyl group; and wherein Z' is a group represented by the formula:

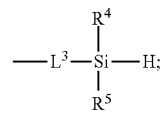

each $R^2$, $R^3$, $R^4$, and $R^5$, independently, is hydrogen, or a $C_1$ to a $C_{20}$ substituted or unsubstituted hydrocarbyl group, where $R^2$ and $R^3$ and/or $R^4$ and $R^5$ may form a cyclic structure with Si (preferably $R^1$ is an aromatic group; preferably phenyl);

each $L^1$, $L^2$, and $L^3$, independently, is a bond or a linking group (preferably, $L^1$ is O);

m is an integer from 1 to 1000 (preferably m is 100 to 500); and o is zero.

In some embodiments of this invention, one or more of the terminal groups of the hydrosilylation modifier is a hydrogen atom, or a $C_1$ to a $C_{20}$ substituted or unsubstituted hydrocarbyl group. Each hydrosilylation modifier has at least one hydrogen atom attached to a silicon group. This hydrogen atom reacts during the hydrosilylation reaction with the vinyl group of the polyolefin to be modified. Where one of the terminal groups is hydrogen, this provides an additional site for reaction during the hydrosilation process. Accordingly, more than one mole of vinyl terminated polyolefin may react with such a hydrosilylation agent having more than one hydrogen atoms available for reaction.

In particular embodiments of this invention, the hydrosilylation modifier may be poly-(phenyl dimethylhydrosiloxy) siloxane, hydride terminated or polymethylhydrosiloxane, trimethylsilyl terminated, both of which are commercially available from Gelest Inc. (Morrisville, Pa.).

In some embodiments of this invention, the molar ratio of the hydride groups of the hydrosilylation modifier to the vinyl group of the vinyl terminated polyolefin may be 20:1, preferably 10:1, more preferably 5:1, more preferably 3:1, and more preferably 2:1. One of skill in the art will appreciate that this ratio may be tailored for desired modified polyolefin structure or for economics.

Vinyl Terminated Polyolefins

The vinyl terminated polyolefin that is reacted with the hydrosilylation modifier is a substituted or unsubstituted hydrocarbyl group having from 20 to about 10,000 carbon atoms and at least 5% vinyl chain ends (relative to total unsaturations). The vinyl terminated polyolefin may be selected from a vinyl terminated polyalphaolefin and a vinyl terminated macromonomer.

Vinyl Terminated Polyalphaolefins

In some embodiments herein, the vinyl terminated polyolefin comprises vinyl terminated polyalphaolefins, preferably vinyl terminated polyethylene. Preferably, the vinyl terminated polyalphaolefins have greater than 50% allyl chain ends (relative to total unsaturation), preferably greater than 60% allyl chain ends, preferably greater than 70% allyl chain ends, preferably greater than 80% allyl chain ends, preferably greater than 90% allyl chain ends, and most preferably greater than 95% allyl chain ends.

Preferred vinyl terminated polyalphaolefins include high density polyethylene (HDPE), for example those commercially available from ExxonMobil Chemical Company (Baytown, Tex.) under the tradename PAXON™ polyethylene.

Vinyl Terminated Macromonomers

In preferred embodiments herein, the vinyl terminated polyolefin comprises vinyl terminated macromonomers (also referred to as "vinyl terminated oligomers" or "macromers"). Macromonomers having allyl chain ends (as defined below) are referred to as "vinyl terminated macromonomers". In embodiments herein, the vinyl terminated polyolefin comprises macromonomers having at least 5% (at least 10%, at least 15%, at least 20%, at least 30%, at least 40%, at least 50%, at least 60%, at least 70%; at least 80%, at least 90%, or at least 95%) allyl chain ends (relative to total unsaturation).

In some embodiments of the invention, the macromonomers have a Mn in the range of from about 300 g/mol to about 30,000 g/mol.

In some embodiments of the invention, the macromonomers are a recycle stream from another process, such as a polyalphaolefin process, and may comprise a mixture of different macromonomers.

In some embodiments of the invention, the vinyl terminated polyolefin comprises a vinyl terminated macromonomer. In some embodiments, a vinyl terminated macromonomer, includes, one or more of:

(i) a vinyl terminated polymer having a Mn of at least 200 g/mol (measured by $^1$H NMR) comprising of one or more $C_4$ to $C_{40}$ higher olefin derived units, where the higher olefin polymer comprises substantially no propylene derived units; and wherein the higher olefin polymer has at least 5% allyl chain ends;

(ii) a copolymer having a Mn of 200 g/mol or more (measured by $^1$H NMR) comprising (a) from about 20 mol % to about 99.9 mol % of at least one $C_5$ to $C_{40}$ higher olefin, and (b) from about 0.1 mol % to about 80 mol % of propylene, wherein the higher olefin copolymer has at least 40% allyl chain ends;

(iii) a copolymer having a Mn of 200 g/mol or more (measured by $^1$H NMR), and comprises (a) from about 80 mol % to about 99.9 mol % of at least one $C_4$ olefin, and (b) from about 0.1 mol % to about 20 mol % of propylene; wherein the vinyl terminated macromonomer has at least 40% allyl chain ends relative to total unsaturation;

(iv) a co-oligomer having a Mn of 200 g/mol to 30,000 g/mol (measured by $^1$H NMR) comprising 10 mol % to 90 mol % propylene and 10 mol % to 90 mol % of ethylene, wherein the oligomer has at least X % allyl chain ends (relative to total unsaturations), where: 1) X=(−0.94*(mol % ethylene incorporated)+100), when 10 mol % to 60 mol % ethylene is present in the co-oligomer, 2) X=45, when greater than 60 mol % and less than 70 mol % ethylene is present in the co-oligomer, and 3) X=(1.83*(mol % ethylene incorporated)-83), when 70 mol % to 90 mol % ethylene is present in the co-oligomer;

(v) a propylene oligomer, comprising more than 90 mol % propylene and less than 10 mol % ethylene wherein the oligomer has: at least 93% allyl chain ends, a number average molecular weight (Mn) of about 500 g/mol to about 20,000 g/mol, an isobutyl chain end to allylic vinyl group ratio of 0.8:1 to 1.35:1.0, and less than 100 ppm aluminum;

(vi) a propylene oligomer, comprising: at least 50 mol % propylene and from 10 mol % to 50 mol % ethylene, wherein the oligomer has: at least 90% allyl chain ends, a Mn of about 150 g/mol to about 10,000 g/mol, and an isobutyl chain end to allylic vinyl group ratio of 0.8:1 to 1.2:1.0, wherein monomers having four or more carbon atoms are present at from 0 mol % to 3 mol %;

(vii) a propylene oligomer, comprising: at least 50 mol % propylene, from 0.1 mol % to 45 mol % ethylene, and from 0.1 mol % to 5 mol % $C_4$ to $C_{12}$ olefin, wherein the oligomer has: at least 90% allyl chain ends, a Mn of about 150 g/mol to about 10,000 g/mol, and an isobutyl chain end to allylic vinyl group ratio of 0.8:1 to 1.35:1.0;

(viii) a propylene oligomer, comprising: at least 50 mol % propylene, from 0.1 mol % to 45 mol % ethylene, and from 0.1 mol % to 5 mol % diene (preferably such as $C_4$ to $C_{12}$ alpha-omega dienes (such as butadiene, hexadiene, octadiene), norbornene, ethylidene norbornene, vinylnorbornene, norbornadiene, and dicyclopentadiene), wherein the oligomer has: at least 90% allyl chain ends, a Mn of about 150 g/mol to about 10,000 g/mol, and an isobutyl chain end to allylic vinyl group ratio of 0.7:1 to 1.35:1.0;

(ix) a homo-oligomer, comprising propylene, wherein the oligomer has: at least 93% allyl chain ends, a Mn of about 500 g/mol to about 20,000 g/mol, an isobutyl chain end to allylic vinyl group ratio of 0.8:1 to 1.2:1.0, and less than 1400 ppm aluminum;

(x) a co-oligomer having a Mn ($^1$H NMR) of 7,500 to 60,000 g/mol comprising one or more alpha olefin derived units comprising ethylene and/or propylene, having 50% or greater allyl chain ends, relative to total number of unsaturated chain ends, and a g'vis of 0.90 or less (g'vis is determined using GPC-DRI, as described below);

(xi) a branched polyolefin having a Mn (GPC) greater than 60,000 g/mol comprising one or more alpha olefins comprising ethylene and/or propylene, having: (i) 50% or greater allyl chain ends, relative to total unsaturated chain ends; (ii) a g'vis of 0.90 or less; and optionally, (iii) a bromine number which, upon complete hydrogenation, decreases by at least 50% (bromine number is determined by ASTM D 1159); and (xii) a branched polyolefin having a Mn ($^1$H NMR) of less than 7,500 g/mol comprising one or more alpha olefin derived units comprising ethylene and/or propylene, having: a ratio of percentage of saturated chain ends to percentage of allyl chain ends of 1.2 to 2.0 and 50% or greater allyl chain ends, relative to total unsaturated chain ends.

Any of the vinyl terminated macromonomers described herein may be homopolymers, copolymers, terpolymers, and so on.

In any embodiment of the invention, the vinyl terminated macromonomers may have a Tg of less than 0° C. or less (as determined by differential scanning calorimetry as described below), preferably −10° C. or less, more preferably −20° C. or less, more preferably −30° C. or less, more preferably −50° C. or less.

In any embodiment of the invention, the vinyl terminated macromonomers described herein may have a melting point (DSC first melt, as described below) of from 60° C. to 130° C., alternately 50° C. to 100° C. In another embodiment, the vinyl terminated macromonomers described herein have no detectable melting point by DSC following storage at ambient temperature (23° C.) for at least 48 hours.

In any embodiment of the invention, the vinyl terminated macromonomers may be a liquid at 25° C. In any embodiment of the invention, the vinyl terminated macromonomers may have an isobutyl chain end to allylic vinyl group ratio of 0.7:1 to 1.35:1.0, preferably 0.8:1 to 1.35:1.0, and more preferably 0.8:1 to 1.2:1.0.

In any embodiment of the invention, the vinyl terminated macromonomers may have less than 3 wt % of functional groups selected from hydroxide, aryls and substituted aryls, halogens, alkoxys, carboxylates, esters, acrylates, oxygen, nitrogen, and carboxyl, preferably less than 2 wt %, more preferably less than 1 wt %, more preferably less than 0.5 wt %, more preferably less than 0.1 wt %, more preferably 0 wt %, based upon the weight of the oligomer.

Vinyl terminated macromonomers generally have a saturated chain end (or terminus) and/or an unsaturated chain end or terminus. The unsaturated chain end of the vinyl terminated macromonomer comprises an "allyl chain end" or a "3-alkyl" chain end. An allyl chain end is represented by $CH_2CH-CH_2-$, as shown in the formula:

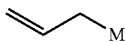

where M represents the polymer chain. "Allylic vinyl group," "allyl chain end," "vinyl chain end," "vinyl termination," "allylic vinyl group," and "vinyl terminated" are used interchangeably in the following description. The number of allyl chain ends, vinylidene chain ends, vinylene chain ends, and other unsaturated chain ends is determined using $^1H$ NMR at 120° C. using deuterated tetrachloroethane as the solvent on an at least 250 MHz NMR spectrometer, and in selected cases, confirmed by $^{13}C$ NMR. Resconi has reported proton and carbon assignments (neat perdeuterated tetrachloroethane used for proton spectra, while a 50:50 mixture of normal and perdeuterated tetrachloroethane was used for carbon spectra; all spectra were recorded at 100° C. on a BRUKER spectrometer operating at 500 MHz for proton and 125 MHz for carbon) for vinyl terminated oligomers in *J. American Chemical Soc.*, 114, 1992, pp. 1025-1032 that are useful herein. Allyl chain ends are reported as a molar percentage of the total number of moles of unsaturated groups (that is, the sum of allyl chain ends, vinylidene chain ends, vinylene chain ends, and the like).

A 3-alkyl chain end (where the alkyl is a $C_1$ to $C_{38}$ alkyl), also referred to as a "3-alkyl vinyl end group" or a "3-alkyl vinyl termination," is represented by the formula:

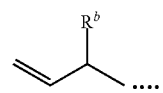

3-alkyl vinyl end group where "●●●●" represents the polyolefin chain and Rb is a $C_1$ to $C_{38}$ alkyl group, or a $C_1$ to $C_{20}$ alkyl group, such as methyl, ethyl, propyl, butyl, pentyl, hexyl, heptyl, octyl, nonyl, decyl, undecyl, dodecyl, and the like. The amount of 3-alkyl chain ends is determined using $^{13}C$ NMR as set out below.

$^{13}C$ NMR data is collected at 120° C. at a frequency of at least 100 MHz, using a BRUKER 400 MHz NMR spectrometer. A 90 degree pulse, an acquisition time adjusted to give a digital resolution between 0.1 and 0.12 Hz, at least a 10 second pulse acquisition delay time with continuous broadband proton decoupling using swept square wave modulation without gating is employed during the entire acquisition period. The spectra is acquired with time averaging to provide a signal to noise level adequate to measure the signals of interest. Samples are dissolved in tetrachloroethane-$d_2$ at concentrations between 10 wt % to 15 wt % prior to being inserted into the spectrometer magnet. Prior to data analysis spectra are referenced by setting the chemical shift of the TCE solvent signal to 74.39 ppm. Chain ends for quantization were identified using the signals shown in the table below. N-butyl and n-propyl were not reported due to their low abundance (less than 5%) relative to the chain ends shown in the table below.

| Chain End | $^{13}C$ NMR Chemical Shift |
| --- | --- |
| P~i-Bu | 23-5 to 25.5 and 25.8 to 26.3 ppm |
| E~i-Bu | 39.5 to 40.2 ppm |
| P~Vinyl | 41.5 to 43 ppm |
| E~Vinyl | 33.9 to 34.4 ppm |

The "allyl chain end to vinylidene chain end ratio" is defined to be the ratio of the percentage of allyl chain ends to the percentage of vinylidene chain ends. The "allyl chain end to vinylene chain end ratio" is defined to be the ratio of the percentage of allyl chain ends to the percentage of vinylene chain ends. Vinyl terminated macromonomers typically also have a saturated chain end. In polymerizations where propylene is present, the polymer chain may initiate growth in a propylene monomer, thereby generating an isobutyl chain end. An "isobutyl chain end" is defined to be an end or terminus of a polymer, represented as shown in the formula below:

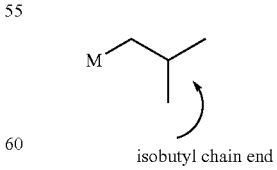

isobutyl chain end where M represents the polymer chain. Isobutyl chain ends are determined according to the procedure set out in WO 2009/155471. The "isobutyl chain end to allylic vinyl group ratio" is defined to be the ratio of the percentage of isobutyl chain ends to the percentage of allyl chain ends.

In polymerizations comprising $C_4$ or greater monomers (or "higher olefin" monomers), the saturated chain end may be a $C_4$ or greater (or "higher olefin") chain end, as shown in the formula below:

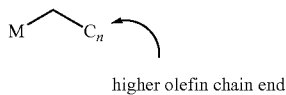

higher olefin chain end where M represents the polymer chain and n is an integer selected from 4 to 40. This is especially true when there is substantially no ethylene or propylene in the polymerization. In an ethylene/($C_4$ or greater monomer) copolymerization, the polymer chain may initiate growth in an ethylene monomer, thereby generating a saturated chain end which is an ethyl chain end. Mn ($^1$H NMR) is determined according to the following NMR method. $^1$H NMR data is collected at either 25° C. or 120° C. (for purposes of the claims, 120° C. shall be used) in a 5 mm probe using a Varian spectrometer with a $^1$H frequency of 250 MHz, 400 MHz, or 500 MHz (for the purpose of the claims, a proton frequency of 400 MHz is used). Data are recorded using a maximum pulse width of 45° C., 8 seconds between pulses, and signal averaging 120 transients. Spectral signals are integrated and the number of unsaturation types per 1000 carbons is calculated by multiplying the different groups by 1000 and dividing the result by the total number of carbons. Mn is calculated by dividing the total number of unsaturated species into 14,000, and has units of g/mol. The chemical shift regions for the olefin types are defined to be between the following spectral regions.

| Unsaturation Type | Region (ppm) | Number of hydrogens per structure |
|---|---|---|
| Vinyl | 4.95-5.10 | 2 |
| Vinylidene (VYD) | 4.70-4.84 | 2 |
| Vinylene | 5.31-5.55 | 2 |
| Trisubstituted | 5.11-5.30 | 1 |

Mn, Mw, Mz, carbon number, and g'vis are measured by a GPC-DRI (Gel Permeation Chromatograph-Differential Refractive Index) method using a High Temperature Size Exclusion Chromatograph (SEC, either from Waters Corporation or Polymer Laboratories), equipped with a DRI. Experimental details, are described in: T. Sun, P. Brant, R. R. Chance, and W. W. Graessley, Macromolecules, 2001, Volume 34, Number 19, pp. 6812-6820 and references therein. Three Polymer Laboratories PLgel 10 mm Mixed-B columns are used. The nominal flow rate is 0.5 $cm^3$/min, and the nominal injection volume is 300 μl. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of Aldrich reagent grade 1,2,4-trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/mL at 25° C. and 1.324 g/mL at 135° C. The injection concentration is from 1.0 to 2.0 mg/mL, with lower concentrations being used for higher molecular weight samples. Prior to running each sample the DRI detector and the injector are purged. Flow rate in the apparatus is then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this invention and the claims thereto (dn/dc)=0.104 for propylene polymers and 0.1 otherwise. Units of parameters used throughout this description of the SEC method are: concentration is expressed in g/$cm^3$, molecular weight is expressed in g/mol, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the DRI analysis, $A_2$ is the second virial coefficient [for purposes of this invention, $A_2$=0.0006 for propylene polymers, 0.0015 for butene polymers and 0.001 otherwise], (dn/dc)=0.104 for propylene polymers, 0.098 for butene polymers and 0.1 otherwise, P(θ) is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index g'vis is defined as:

$$g'vis = \frac{[\eta]_{avg}}{kM_v^\alpha}$$

where, for purpose of this invention and claims thereto, $\alpha=0.695$ and $k=0.000579$ for linear ethylene polymers, $\alpha=0.705$ $k=0.000262$ for linear propylene polymers, and $\alpha=0.695$ and $k=0.000181$ for linear butene polymers. $M_v$ is the viscosity-average molecular weight based on molecular weights determined by LS analysis. See Macromolecules, 2001, 34, pp. 6812-6820 and Macromolecules, 2005, 38, pp. 7181-7183, for guidance on selecting a linear standard having similar molecular weight and comonomer content, and determining k coefficients and $\alpha$ exponents.

Tm, Hf, and Tg are measured using Differential Scanning Calorimetry (DSC) using commercially available equipment such as a TA Instruments Model Q100. Typically, 6 to 10 mg of the sample, that has been stored at 25° C. for at least 48 hours, is sealed in an aluminum pan and loaded into the instrument at 25° C. The sample is equilibrated at 25° C., then it is cooled at a cooling rate of 10° C./min to −80° C. The sample is held at −80° C. for 5 min and then heated at a heating rate of 10° C./min to 25° C. The glass transition temperature is measured from the heating cycle. Alternatively, the sample is equilibrated at 25° C. for 5 minutes, then heated at a heating rate of 10° C./min to 200° C., followed by an equilibration at 200° C. for 5 minutes, and cooled at 10° C./min to −80° C. The endothermic melting transition, if present, is analyzed for onset of transition and peak temperature. The melting temperatures reported are the peak melting temperatures from the first heat unless otherwise specified. For samples displaying multiple peaks, the melting point (or melting temperature) is defined to be the peak melting temperature associated with the largest endothermic calorimetric response in that range of temperatures from the DSC melting trace. Areas under the DSC curve are used to determine the heat of transition (heat of fusion, Hf, upon melting or heat of crystallization, Hc, upon crystallization, if the Hf value from the melting is different from the Hc value obtained for the heat of crystallization, then the value from the melting (Tm) shall be used), which can be used to calculate the degree of crystallinity (also called the percent crystallinity). The percent crystallinity (X %) is calculated using the formula: [area under the curve (in J/g)/H° (in J/g)]*100, where H° is the heat of fusion for the homopolymer of the major monomer component. These values for H° are to be obtained from the *Polymer Handbook, Fourth Edition*, published by John Wiley and Sons, New York 1999, except that a value of 290 J/g is used as the equilibrium heat of fusion)(H°) for 100% crystalline polyethylene, a value of 140 J/g is used as the equilibrium heat of fusion)(H°) for 100% crystalline polybutene, and a value of 207 J/g)(H°) is used as the heat of fusion for a 100% crystalline polypropylene.

In some embodiments of the invention, the vinyl terminated macromonomer has a Mn of at least 200 g/mol, (e.g., 200 g/mol to 100,000 g/mol, e.g., 200 g/mol to 75,000 g/mol, e.g., 200 g/mol to 60,000 g/mol, e.g., 300 g/mol to 60,000 g/mol, or e.g., 750 g/mol to 30,000 g/mol) (measured by $^1$H NMR) and comprise one or more (e.g., two or more, three or more, four or more, and the like) $C_4$ to $C_{40}$ (e.g., $C_4$ to $C_{30}$, $C_4$ to $C_{20}$, or $C_4$ to $C_{12}$, e.g., butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof) olefin derived units, where the vinyl terminated macromonomer comprises substantially no propylene derived units (e.g., less than 0.1 wt % propylene, e.g., 0 wt %); and wherein the vinyl terminated macromonomer has at least 5% (at least 10%, at least 15%, at least 20%, at least 30%, at least 40%, at least 50%, at least 60%, at least 70%; at least 80%, at least 90%, or at least 95%) allyl chain ends (relative to total unsaturation); and optionally, an allyl chain end to vinylidene chain end ratio of 1:1 or greater (e.g., greater than 2:1, greater than 2.5:1, greater than 3:1, greater than 5:1, or greater than 10:1); and even further optionally, e.g., substantially no isobutyl chain ends (e.g., less than 0.1 wt % isobutyl chain ends). In some embodiments, the vinyl terminated macromonomers may also comprise ethylene derived units, e.g., at least 5 mol % ethylene (e.g., at least 15 mol % ethylene, e.g., at least 25 mol % ethylene, e.g., at least 35 mol % ethylene, e.g., at least 45 mol % ethylene, e.g., at least 60 mol % ethylene, e.g., at least 75 mol % ethylene, or e.g., at least 90 mol % ethylene). Such vinyl terminated macromonomers and methods to make them are further described in U.S. Ser. No. 13/072,288, filed on Mar. 25, 2011 (published as US 2012-0245312), which is hereby incorporated by reference.

In some embodiments of the invention, the vinyl terminated macromonomers may have a Mn (measured by $^1$H NMR) of greater than 200 g/mol (e.g., 300 g/mol to 60,000 g/mol, 400 g/mol to 50,000 g/mol, 500 g/mol to 35,000 g/mol, 300 g/mol to 15,000 g/mol, 400 g/mol to 12,000 g/mol, or 750 g/mol to 10,000 g/mol), and comprise:

(a) from about 20 mol % to 99.9 mol % (e.g., from about 25 mol % to about 90 mol %, from about 30 mol % to about 85 mol %, from about 35 mol % to about 80 mol %, from about 40 mol % to about 75 mol %, or from about 50 mol % to about 95 mol %) of at least one $C_5$ to $C_{40}$ (e.g., $C_6$ to $C_{20}$) higher olefin; and (b) from about 0.1 mol % to about 80 mol % (e.g., from about 5 mol % to about 70 mol %, from about 10 mol % to about 65 mol %, from about 15 mol % to about 55 mol %, from about 25 mol % to about 50 mol %, or from about 30 mol % to about 80 mol %) of propylene;

wherein the vinyl terminated macromonomer has at least 40% allyl chain ends (e.g., at least 50% allyl chain ends, at least 60% allyl chain ends, at least 70% allyl chain ends, at least 80% allyl chain ends, at least 90% allyl chain ends, or at least 95% allyl chain ends) relative to total unsaturation; and, optionally, an isobutyl chain end to allyl chain end ratio of less than 0.70:1, less than 0.65:1, less than 0.60:1, less than 0.50:1, or less than 0.25:1; and further optionally, an allyl chain end to vinylidene chain end ratio of greater than 2:1 (e.g., greater than 2.5:1, greater than 3:1, greater than 5:1, or greater than 10:1); and even further optionally, an allyl chain end to vinylene ratio is greater than 1:1 (e.g., greater than 2:1 or greater than 5:1). Such macromonomers and methods to make them are further described in U.S. Ser. No. 13/072,249, filed on Mar. 25, 2011 (published as US 2012-0245310), hereby incorporated by reference.

In another embodiment of the invention, the vinyl terminated macromonomer has a Mn of 300 g/mol or more (measured by $^1$H NMR, e.g., 300 g/mol to 60,000 g/mol, 400 g/mol to 50,000 g/mol, 500 g/mol to 35,000 g/mol, 300 g/mol to 15,000 g/mol, 400 g/mol to 12,000 g/mol, or 750 g/mol to 10,000 g/mol), and comprises:
(a) from about 80 mol % to about 99.9 mol % of at least one $C_4$ olefin, e.g., about 85 mol % to about 99.9 mol %, e.g., about 90 mol % to about 99.9 mol %;
(b) from about 0.1 mol % to about 20 mol % of propylene, e.g., about 0.1 mol % to about 15 mol %, e.g., about 0.1 mol % to about 10 mol %; and
wherein the vinyl terminated macromonomer has at least 40% allyl chain ends (e.g., at least 50% allyl chain ends, at least 60% allyl chain ends, at least 70% allyl chain ends, at least 80% allyl chain ends, at least 90% allyl chain ends, or at least 95% allyl chain ends) relative to total unsaturation; and in some embodiments, an isobutyl chain end to allyl chain end ratio of less than 0.70:1, less than 0.65:1, less than 0.60:1, less than 0.50:1, or less than 0.25:1; and in further embodiments, an allyl chain end to vinylidene group ratio of more than 2:1, more than 2.5:1, more than 3:1, more than 5:1, or more than 10:1. Such macromonomers and methods to make them are also further described in U.S. Ser. No. 13/072,249 filed on Mar. 25, 2011 (published as US 2012-0245310), hereby incorporated by reference.

In other embodiments of the invention, the vinyl terminated macromonomer is a propylene co-oligomer having a Mn of 300 g/mol to 30,000 g/mol as measured by $^1$H NMR (e.g., 400 g/mol to 20,000 g/mol, e.g., 500 g/mol to 15,000 g/mol, e.g., 600 g/mol to 12,000 g/mol, e.g., 800 g/mol to 10,000 g/mol, e.g., 900 g/mol to 8,000 g/mol, e.g., 900 g/mol to 7,000 g/mol), comprising 10 mol % to 90 mol % propylene (e.g., 15 mol % to 85 mol %, e.g., 20 mol % to 80 mol %, e.g., 30 mol % to 75 mol %, e.g., 50 mol % to 90 mol %) and 10 mol % to 90 mol % (e.g., 85 mol % to 15 mol %, e.g., 20 mol % to 80 mol %, e.g., 25 mol % to 70 mol %, e.g., 10 mol % to 50 mol %) of one or more alpha-olefin comonomers (e.g., ethylene, butene, hexene, or octene, e.g., ethylene), wherein the oligomer has at least X % allyl chain ends (relative to total unsaturations), where: 1) X=(−0.94*(mol % ethylene incorporated)+100 {alternately 1.20 (−0.94 (mol % ethylene incorporated)+100), alternately 1.50(−0.94 (mol % ethylene incorporated)+100)}), when 10 mol % to 60 mol % ethylene is present in the co-oligomer; 2) X=45 (alternately 50, alternately 60), when greater than 60 mol % and less than 70 mol % ethylene is present in the co-oligomer; and 3) X=(1.83*(mol % ethylene incorporated)−83, {alternately 1.20 [1.83*(mol % ethylene incorporated)−83], alternately 1.50 [1.83*(mol % ethylene incorporated)−83]}), when 70 mol % to 90 mol % ethylene is present in the co-oligomer. Such macromonomers and methods to make them are further described in U.S. Pat. No. 8,372,930, hereby incorporated by reference.

In other embodiments of the invention, the vinyl terminated macromonomer is a propylene oligomer, comprising more than 90 mol % propylene (e.g., 95 mol % to 99 mol %, e.g., 98 mol % to 9 mol %) and less than 10 mol % ethylene (e.g., 1 mol % to 4 mol %, e.g., 1 mol % to 2 mol %), wherein the oligomer has: at least 93% allyl chain ends (e.g., at least 95%, e.g., at least 97%, e.g., at least 98%); a number average molecular weight (Mn) of about 400 g/mol to about 30,000 g/mol, as measured by $^1$H NMR (e.g., 500 g/mol to 20,000 g/mol, e.g., 600 g/mol to 15,000 g/mol, e.g., 700 g/mol to 10,000 g/mol, e.g., 800 g/mol to 9,000 g/mol, e.g., 900 g/mol to 8,000 g/mol, e.g., 1,000 g/mol to 6,000 g/mol); an isobutyl chain end to allylic vinyl group ratio of 0.8:1 to 1.35:1.0; and less than 1400 ppm aluminum, (e.g., less than 1200 ppm, e.g., less than 1000 ppm, e.g., less than 500 ppm, e.g., less than 100 ppm). Such macromonomers and methods to make them are further described in U.S. Pat. No. 8,372, 930, hereby incorporated by reference.

In other embodiments of the invention, the vinyl terminated macromonomer is a propylene oligomer, comprising: at least 50 mol % (e.g., 60 mol % to 90 mol %, e.g., 70 mol % to 90 mol %) propylene and from 10 mol % to 50 mol % (e.g., 10 mol % to 40 mol %, e.g., 10 mol % to 30 mol %) ethylene, wherein the oligomer has: at least 90% allyl chain ends (e.g., at least 91%, e.g., at least 93%, e.g., at least 95%, e.g., at least 98%); a Mn of about 150 g/mol to about 20,000 g/mol, as measured by $^1$H NMR (e.g., 200 g/mol to 15,000 g/mol, e.g., 250 g/mol to 15,000 g/mol, e.g., 300 g/mol to 10,000 g/mol, e.g., 400 g/mol to 9,500 g/mol, e.g., 500 g/mol to 9,000 g/mol, e.g., 750 g/mol to 9,000 g/mol); and an isobutyl chain end to allylic vinyl group ratio of 0.8:1 to 1.3:1.0, wherein monomers having four or more carbon atoms are present at from 0 mol % to 3 mol % (e.g., at less than 1 mol %, e.g., less than 0.5 mol %, e.g., at 0 mol %). Such macromonomers and methods to make them are further described in US 2009/0318644, hereby incorporated by reference.

In other embodiments of the invention, the vinyl terminated macromonomer is a propylene oligomer, comprising: at least 50 mol % (e.g., at least 60 mol %, e.g., 70 mol % to 99.5 mol %, e.g., 80 mol % to 99 mol %, e.g., 90 mol % to 98.5 mol %) propylene, from 0.1 mol % to 45 mol % (e.g., at least 35 mol %, e.g., 0.5 mol % to 30 mol %, e.g., 1 mol % to 20 mol %, e.g., 1.5 mol % to 10 mol %) ethylene, and from 0.1 mol % to 5 mol % (e.g., 0.5 mol % to 3 mol %, e.g., 0.5 mol % to 1 mol %) $C_4$ to $C_{12}$ olefin (such as butene, hexene, or octene, e.g., butene), wherein the oligomer has: at least 90% allyl chain ends (e.g., at least 91%, e.g., at least 93%, e.g., at least 95%, e.g., at least 98%); a number average molecular weight (Mn) of about 150 g/mol to about 15,000 g/mol, as measured by $^1$H NMR (e.g., 200 g/mol to 12,000 g/mol, e.g., 250 g/mol to 10,000 g/mol, e.g., 300 g/mol to 10,000 g/mol, e.g., 400 g/mol to 9500 g/mol, e.g., 500 g/mol to 9,000 g/mol, e.g., 750 g/mol to 9,000 g/mol); and an isobutyl chain end to allylic vinyl group ratio of 0.8:1 to 1.35:1.0. Such macromonomers and methods to make them are further described in US 2009/0318644, hereby incorporated by reference.

In other embodiments of the invention, the vinyl terminated macromonomer is a propylene oligomer, comprising: at least 50 mol % (e.g., at least 60 mol %, e.g., 70 mol % to 99.5 mol %, e.g., 80 mol % to 99 mol %, e.g., 90 mol % to 98.5 mol %) propylene, from 0.1 mol % to 45 mol % (e.g., at least 35 mol %, e.g., 0.5 mol % to 30 mol %, e.g., 1 mol % to 20 mol %, e.g., 1.5 mol % to 10 mol %) ethylene, and from 0.1 mol % to 5 mol % (e.g., 0.5 mol % to 3 mol %, e.g., 0.5 mol % to 1 mol %) diene (such as $C_4$ to $C_{12}$ alpha-omega dienes (such as butadiene, hexadiene, octadiene), norbornene, ethylidene norbornene, vinylnorbornene, norbornadiene, and dicyclopentadiene), wherein the oligomer has at least 90% allyl chain ends (e.g., at least 91%, e.g., at least 93%, e.g., at least 95%, e.g., at least 98%); a number average molecular weight (Mn) of about 150 g/mol to about 20,000 g/mol, as measured by $^1$H NMR (e.g., 200 g/mol to 15,000 g/mol, e.g., 250 g/mol to 12,000 g/mol, e.g., 300 g/mol to 10,000 g/mol, e.g., 400 g/mol to 9,500 g/mol, e.g., 500 g/mol to 9,000 g/mol, e.g., 750 g/mol to 9,000 g/mol); and an isobutyl chain end to allylic vinyl group ratio of 0.7:1 to 1.35:1.0. Such macromonomers and methods to make them are further described in US 2009/0318644, hereby incorporated by reference.

In other embodiments of the invention, the vinyl terminated macromonomer is a propylene homo-oligomer, comprising propylene and less than 0.5 wt % comonomer, e.g., 0 wt % comonomer, wherein the oligomer has:
i) at least 93% allyl chain ends (e.g., at least 95%, e.g., at least 96%, e.g., at least 97%, e.g., at least 98%, e.g., at least 99%);
ii) a number average molecular weight (Mn) of about 500 g/mol to about 20,000 g/mol, as measured by $^1$H NMR (e.g., 500 g/mol to 15,000 g/mol, e.g., 700 g/mol to 10,000 g/mol, e.g., 800 g/mol to 8,000 g/mol, e.g., 900 g/mol to 7,000 g/mol, e.g., 1,000 g/mol to 6,000 g/mol, e.g., 1,000 g/mol to 5,000 g/mol);
iii) an isobutyl chain end to allylic vinyl group ratio of 0.8:1 to 1.3:1.0; and
iv) less than 1400 ppm aluminum, (e.g., less than 1200 ppm, e.g., less than 1000 ppm, e.g., less than 500 ppm, e.g., less than 100 ppm). Such macromonomers and methods to make them are also further described in US 2009/0318644, hereby incorporated by reference.

In yet other embodiments of the invention, the vinyl terminated macromonomer is a branched polyolefin having a Mn (measured by $^1$H NMR) of 7,500 to 60,000 g/mol, comprising one or more alpha olefins (preferably propylene and/or ethylene, preferably propylene) and, optionally, a $C_4$ to $C_{40}$ alpha olefin (preferably a $C_4$ to $C_{20}$ alpha olefin, preferably a $C_4$ to $C_{12}$ alpha olefin, preferably butene, pentene, hexene, heptene, octene, nonene, decene, cyclopentene, cycloheptene, cyclooctene, cyclooctadiene, and isomers thereof), and having:
(i) 50% or greater allyl chain ends, relative to total unsaturated chain ends (preferably 60% or more, preferably 70% or more, preferably 75% or more, preferably 80% or more, preferably 90% or more, preferably 95% or more);
(ii) a g'vis of 0.90 or less (preferably 0.85 or less, preferably 0.80 or less); and/or a ratio of percentage of saturated chain ends (preferably isobutyl chain ends) to percentage of allyl chain ends of 1.2 to 2.0 (preferably 1.6 to 1.8), wherein the percentage of saturated chain ends is determined using $^{13}$C NMR as described in WO 2009/155471 at paragraph [0095] and [0096] except that the spectra are referenced to the chemical shift of the solvent, tetrachloroethane-d$_2$, and/or a ratio of Mn(GPC)/Mn($^1$H NMR) of 0.95 or less (preferably 0.90 or less, preferably 0.85 or less, preferably 0.80 or less);
(iii) optionally, a peak melting point (Tm) of greater than 60° C. (preferably greater than 100° C., preferably from 60° C. to 180° C., preferably from 80 to 175° C.);
(iv) optionally, a heat of fusion (Hf) of greater than 7 J/g (preferably greater than 15 J/g, greater than 30 J/g, greater than 50 J/g, greater than 60 J/g, or greater than 80 J/g);
(v) optionally, an allyl chain end to internal vinylidene ratio of greater than 5:1 (preferably greater than 10:1);
(vi) optionally, an allyl chain end to vinylidene chain end ratio of greater than 10:1 (preferably greater than 15:1); and
(vii) optionally, an allyl chain end to vinylene chain end ratio of greater than 1:1 (preferably greater than 2:1, greater than 5:1, or greater than 10:1). Such macromonomers and methods to make them are further described in US 2012-0245299, which is incorporated in its entirety herein.

In other embodiments of the invention, the vinyl terminated macromonomer is a branched polyolefin having a Mn (measured by GPC) of greater than 60,000 g/mol, comprising one or more alpha olefins (preferably propylene and/or ethylene, preferably propylene) and optionally, a $C_4$ to $C_{40}$ alpha olefin (preferably a $C_4$ to $C_{20}$ alpha olefin, preferably a $C_4$ to $C_{12}$ alpha olefin, preferably butene, pentene, hexene, heptene, octene, nonene, decene, cyclopentene, cycloheptene, cyclooctene, cyclooctadiene, and isomers thereof) and having:
(i) 50% or greater allyl chain ends, relative to total unsaturated chain ends (preferably 60% or more, preferably 70% or more, preferably 75% or more, preferably 80% or more, preferably 90% or more, preferably 95% or more);
(ii) a g'vis of 0.90 or less (preferably 0.85 or less, preferably 0.80 or less);
(iii) optionally, a bromine number which, upon complete hydrogenation, decreases by at least 50% (preferably at least 75%);
(iv) optionally, a Tm of greater than 60° C. (preferably greater than 100° C., preferably from 60° C. to 180° C., preferably from 80° C. to 175° C.); and
(v) optionally, an Hf of greater than 7 J/g (preferably greater than 15 J/g, greater than 30 J/g, greater than 50 J/g, greater than 60 J/g, or greater than 80 J/g). Such macromonomers and methods to make them are further described in US 2012-0245299, which is incorporated in its entirety herein.

In yet other embodiments of the invention, the vinyl terminated macromonomer is a branched polyolefin having a Mn (measured by $^1$H NMR) of less than 7,500 g/mol (preferably from 100 to 7,500 g/mol), comprising one or more alpha olefins (preferably propylene and/or ethylene, preferably propylene) and, optionally, a $C_4$ to $C_{40}$ alpha olefin (preferably a $C_4$ to $C_{20}$ alpha olefin, preferably a $C_4$ to $C_{12}$ alpha olefin, preferably butene, pentene, hexene, heptene, octene, nonene, decene, cyclopentene, cycloheptene, cyclooctene, cyclooctadiene, and isomers thereof) and having:
(i) 50% or greater allyl chain ends, relative to total number of unsaturated chain ends (preferably 60% or more, preferably 70% or more, preferably 75% or more, preferably 80% or more, preferably 90% or more, preferably 95% or more);
(ii) a ratio of percentage of saturated chain ends (preferably isobutyl chain ends) to percentage of allyl chain ends of 1.2 to 2.0 (preferably 1.6 to 1.8), wherein the percentage of saturated chain ends is determined using $^{13}$C NMR as described in WO 2009/155471 at paragraph [0095] and [0096] except that the spectra are referenced to the chemical shift of the solvent, tetrachloroethane-d$_2$, and/or a ratio of Mn(GPC)/Mn($^1$H NMR) of 0.95 or less (preferably 0.90 or less, preferably 0.85 or less, preferably 0.80 or less);
(iii) optionally, a Tm of greater than 60° C. (preferably greater than 100° C., preferably from 60 to 180° C., preferably from 80 to 175° C.);
(iv) optionally, an Hf of greater than 7 J/g (preferably greater than 15 J/g, greater than 30 J/g, greater than 50 J/g, greater than 60 J/g, or greater than 80 J/g);
(v) optionally, an allyl chain end to internal vinylidene ratio of greater than 5:1 (preferably greater than 10:1);
(vi) optionally, an allyl chain end to vinylidene chain end ratio of greater than 10:1 (preferably greater than 15:1); and
(vii) optionally, an allyl chain end to vinylene chain end ratio of greater than 1:1
(preferably greater than 2:1, greater than 5:1, or greater than 10:1). Such macromonomers and methods to make them are further described in US 2012-0245299, which is incorporated in its entirety herein.

Modified Polyolefins

Some embodiments of this invention relate to a modified polyolefin represented by the formula:

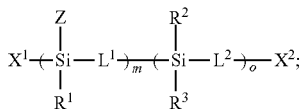

wherein:
Z is a group represented by the formula:

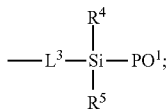

wherein $PO^1$ is a substituted or unsubstituted hydrocarbyl group having from 20 to about 10,000 carbon atoms;
$R^1$ is Z, hydrogen, a $C_1$ to a $C_{20}$ substituted or unsubstituted hydrocarbyl group, or $PO^4$, wherein $PO^4$ is a substituted or unsubstituted hydrocarbyl group having from 20 to about 10,000 carbon atoms;
each $R^2$, $R^3$, $R^4$, and $R^5$, independently, is hydrogen, a $C_1$ to a $C_{20}$ substituted or unsubstituted hydrocarbyl group, wherein $R^2$ and $R^3$ and/or $R^4$ and $R^5$ may form a cyclic structure with Si, or, a $PO^4$;
each $L^1$, $L^2$, and $L^3$, independently, is a bond or a linking group;
m is an integer from 1 to 1000;
o is an integer from 0 to 1000; and
$X^1$ and $X^2$, each independently, is hydrogen, a $C_1$ to a $C_{20}$ substituted or unsubstituted hydrocarbyl group, or a $PO^4$;
wherein each $PO^1$ and $PO^4$ may be the same or different.

Other embodiments of this invention relate to a modified polyolefin represented by the formula:

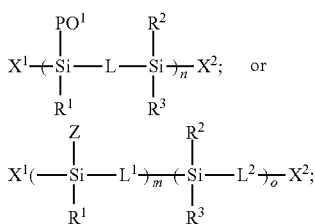

wherein:
Z is a group represented by the formula:

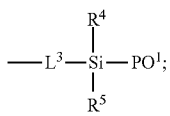

wherein $PO^1$ is a substituted or unsubstituted hydrocarbyl group having from 20 to about 10,000 carbon atoms derived from a vinyl terminated macromonomer;
each $R^1$, $R^2$, $R^3$, $R^4$, and $R^5$, independently, is a H, a $C_1$ to a $C_{20}$ substituted or unsubstituted hydrocarbyl group, where $R^2$ and $R^3$ may form a cyclic structure with Si, or a $PO^4$, wherein $PO^4$ is a substituted or unsubstituted hydrocarbyl group having from 20 to about 10,000 carbon atoms derived from a vinyl terminated macromonomer;
each L, $L^1$, $L^2$, and $L^3$, if present, is a bond or a linking group;
m is an integer from 1 to 1000;
n is an integer from 1 to 1000;
o is an integer from 0 to 1000; and
$X^1$ and $X^2$, each independently, is hydrogen, a $C_1$ to a $C_{20}$ substituted or unsubstituted hydrocarbyl group, or a $PO^4$;
wherein each $PO^1$ and $PO^4$ may be the same or different.

Each $PO^1$ and $PO^4$, independently, is derived from a vinyl terminated polyalphaolefin or a vinyl terminated macromonomer. In a preferred embodiment, the $PO^1$ and/or $PO^4$ in the formulae above is a hydrocarbyl or substituted hydrocarbyl having 100 to 10,000 carbon atoms, preferably 500 to 10,000, preferably 1000 to 10,000, preferably 5000 to 10,000 carbon atoms, preferably $PO^1$ and/or $PO^4$ is derived from substituted or unsubstituted eicosene, polyethylene or polypropylene.

In some embodiments of the invention, $R^1$ is an aromatic group; $L^1$ is an oxygen atom; $L^3$ is an oxygen atom; each $R^4$ and $R^5$, independently, is a $C_1$ to a $C_{20}$ substituted or unsubstituted hydrocarbyl group; m is 100 to 500; and o is 0.

In a preferred embodiment, the modified polyolefin has a Mn of from 500 to 50,000 g/mol, preferably from 1000 to 30,000 g/mol, preferably from 1500 to 10,000 g/mol.

In a preferred embodiment the "polyolefin" portion of the hydrosilane-modified polyolefin is derived from a homopolymer, homo-oligomer, copolymer or co-oligomer comprising one or more $C_2$ to $C_{40}$ olefins, preferably $C_2$ to $C_{40}$ alpha-olefins, preferably ethylene, propylene, butene, pentene, hexene, octene, nonene, decene, undecene, and dodecene.

In a preferred embodiment, the hydrosilane-modified polyolefin is an oligomer having a Mn of from 500 to 21,000 g/mol (preferably 700 to 21,000, preferably 800 to 20,000 g/mol) comprising one or more alpha-olefins selected from the group consisting of $C_2$ to $C_{40}$ alpha-olefins, preferably ethylene, propylene, butene, pentene, hexene, octene, nonene, decene, undecene, and dodecene. Preferably, the oligomer portion of the polyhydrosilane-modified polyolefin is an ethylene oligomer, e.g., a homo-oligomer of ethylene or co-oligomer of ethylene and up to 50 mol % (preferably from 0.5 mol % to 25 mol %, preferably from 1 mol % to 20 mol %) of one or more $C_2$ to $C_{40}$ alpha-olefin comonomers, preferably selected from the group consisting of propylene, butene, pentene, hexene, octene, nonene, decene, undecene, and dodecene. Alternately, the oligomer portion of the polyhydrosilane-modified polyolefin is a propylene oligomer, e.g., a homo-oligomer of propylene or co-oligomer of propylene and up to 50 mol % (preferably from 0.5 mol % to 25 mol %, preferably from 1 mol % to 20 mol %) of one or more $C_2$ to $C_{40}$ alpha-olefin comonomers, preferably selected from the group consisting of ethylene, butene, pentene, hexene, octene, nonene, decene, undecene, and dodecene.

In a preferred embodiment, the polyhydrosilane-modified polyolefin is a polymer having a Mn of greater than 21,000 g/mol (preferably from 25,000 to 100,000, preferably 25,000 to 50,000 g/mol) comprising one or more alpha-olefins selected from the group consisting of $C_2$ to $C_{40}$ alpha-olefins, preferably ethylene, propylene, butene, pentene, hexene, octene, nonene, decene, undecene, and dodecene. Preferably, the polymer portion of the polyhydrosilane-modified polyolefin is an ethylene polymer, e.g., a homopolymer of ethylene or co-polymer of ethylene and up to 50 mol % (preferably from 0.5 mol % to 25 mol %, preferably from 1 mol % to 20 mol %) of one or more $C_3$ to $C_{40}$ alpha-olefin comonomers, preferably selected from the group consisting of propylene, butene, pentene, hexene, octene, nonene, decene, undecene, and dodecene. Alternately, the polymer portion of the polyhydrosilane-modified polyolefin is propylene polymer, e.g., a homopolymer of propylene or a co-polymer of propylene and up to 50 mol % (preferably from 0.5 mol % to 25 mol %, preferably from 1 mol % to 20 mol %) of one or more $C_2$ to $C_{40}$ alpha-olefins comonomers, preferably selected from the group consisting of ethylene, butene, pentene, hexene, octene, nonene, decene, undecene, and dodecene.

In another embodiment, the polyhydrosilane-modified polyolefins consist essentially of propylene, functional group and, optionally, ethylene. Alternately, $C_4$ olefins (such as isobutylene, butadiene, n-butene) are substantially absent from the polyhydrosilane-modified polyolefins. Alternately, $C_{4-20}$ olefins are substantially absent from the polyhydrosilane-modified polyolefins. Alternately, isobutylene is substantially absent from the polyhydrosilane-modified polyolefins. By substantially absent is meant that the monomer is present in the polyolefin at 1 wt % or less, preferably at 0.5 wt % or less, preferably at 0 wt %.

In a preferred embodiment, the polyhydrosilane-modified polyolefins produced herein have a melting point (DSC, second melt) of 100° C. or more, preferably 120° C. or more, preferably 130° C. or more. In another preferred embodiment, the polyhydrosilane-modified polyolefin produced herein is a polyhydrosilane-modified propylene polymer having a melting point (DSC, second melt) of 145° C. or more, preferably 150° C. or more, preferably 155° C. or more. In another preferred embodiment, the polyhydrosilane-modified polyolefin produced herein is a polyhydrosilane-modified ethylene polymer having a melting point (DSC, second melt) of 100° C. or more, preferably 110° C. or more, preferably 125° C. or more.

The polyhydrosilane-modified polyolefins may be characterized by any degree of tacticity, including isotacticity or syndiotacticity, and/or may be atactic. In an embodiment, the polyhydrosilane-modified polyolefin has more than 50% meso dyads as measured by $^{13}C$ NMR, preferably more than 60%. In an alternate embodiment, the polyhydro-silane modified polyolefin has more than 50% racemic dyads as measured by $^{13}C$ NMR, preferably more than 60%.

Particularly useful polyhydrosilane-modified polyolefins may be isotactic, highly isotactic, syndiotactic, or highly syndiotactic propylene polymer, particularly isotactic polypropylene. As used herein, "isotactic" is defined as having at least 10% isotactic pentads, preferably having at least 40% isotactic pentads of methyl groups derived from propylene according to analysis by $^{13}C$ NMR. As used herein, "highly isotactic" is defined as having at least 60% isotactic pentads according to analysis by $^{13}C$ NMR. In a desirable embodiment, the polyhydrosilane-modified polyolefin (preferably polypropylene) has at least 85% isotacticity. As used herein, "syndiotactic" is defined as having at least 10% syndiotactic pentads, preferably at least 40%, according to analysis by $^{13}C$ NMR. As used herein, "highly syndiotactic" is defined as having at least 60% syndiotactic pentads according to analysis by $^{13}C$ NMR. In another embodiment, the polyhydrosilane modified polyolefin (preferably polypropylene) has at least 85% syndiotacticity.

In a preferred embodiment, the polyhydrosilane-modified polyolefins described herein have less than 10% allyl chain ends, preferably less than 8%, preferably less than 6%, preferably less than 5%, preferably less than 4%, preferably less than 3%, preferably less than 2%, preferably less than 1% (relative to total unsaturations as measured by $^1H$ NMR, using the protocol described in U.S. Pat. No. 8,372,930). No hydrogen or chain transfer/termination agent should be used during functionalization, derivatization, or stripping (of unreacted monomer) for measurement of unsaturations.

In some embodiments, the number of modified groups (i.e., polysilane groups) is present at 0.60 to 1.2, alternately 0.75 to 1.1 functional groups per chain (preferably assuming that Mn has not altered by more than 15% as compared to the Mn of the polyolefin prior to functionalization and optional derivatization). Number of functional groups per chain=F/Mn as determined by $^1H$ NMR as follows. The instrument used is a 400 MHz Varian pulsed Fourier transform NMR spectrometer equipped with a variable temperature proton detection probe operating at 120° C. The sample is dissolved in 1,1,2,2-tetrachloroethane-$d_2$ (TCE-$d_2$) or $CDCl_3$ and transferred into a 5 mm glass NMR tube. (The solvent has less than 10,000 ppm water and is free of other contaminants that could change the chemical shifts in the NMR spectrum.) Acquisition parameters are pulse width=45°, acquisition delay=8 s and number of scans=120. Chemical shifts are determined relative to the residual TCE-$d_1$ signal which is set to 5.98 ppm and residual $CHCl_3$, which is set at 7.24 ppm. VRA is the normalized integrated signal intensity for the vinyls with shifts between from about 4.9 to 5.1 ppm. VDRA is the normalized integrated signal intensity for the vinylidene resonances between from about 4.65 to 4.85 ppm and the vinylene resonances at from about 5.15 to 5.6 ppm. IA is the normalized integrated signal intensities for the aliphatic region of interest between from about 0 to 2.1 ppm (IA). The number of vinyl groups/1000 Carbons (VI) is determined from the formula: (VRA*1000)/(IA+VRA+VDRA). Likewise, the number of vinylidene & vinylene groups/1000 carbons (VE) is determined from the formula: (VDRA*1000)/(IA+VRA+VDRA). VRA, VDRA and IA are the normalized integrated signal intensities in the chemical shift regions defined above. Mn is calculated assuming one unsaturated end-group per polyolefin chain. Mn=(14,000 g/mol)/(VI+VE).

After the polyolefin in question is modified, it is necessary to identify the resonances/chemical shift regions of the functional group in order to determine % functionalization of the polyolefin. To do so, the above $^1H$ NMR procedure is repeated on a clean sample of the modified polyolefin (e.g., washed to remove unreacted materials, contaminants, etc.). Refer to "The Sadtler Guide to NMR Spectra", ed. William Walter Simons, published by the Sadtler Research Laboratories, 1972 for assistance in determining the shift regions for specific functional groups.

Percent functionalization of the polyolefin=100−[100× (VI*+VE*)/(VI+VE)]+VI+VE). The number of vinyl groups/1000 carbons (VI*) and number of vinylidene groups/1000 carbons (VE*) for the modified polyolefin are determined from the $^1H$ NMR spectra of the modified oligomer in the same manner as VI and VE for the unmodified polyolefin. Preferably the percent functionalization of the polyolefin is 75% or more, preferably 80% or more, preferably 90% or more, preferably 95% or more.

In other embodiments, the presence of the modified polyolefin is detected by the disappearance of the $^1H$ NMR vinyl signature shift between from about 4.9 to 5.1 ppm and a concurrent suppression of the FTIR Si—H peak at 2170 $cm^{-1}$.

In yet other embodiments, the modified polyolefin may have a branching index, $g'_{vis}$ (as determined by GPC) greater than that of the unmodified polyolefin. The modified polyolefin produced herein has a branching index, $g'_{vis}$ (as determined by GPC), of 0.98 or less, alternately 0.96 or less, alternately 0.95 or less, alternately 0.93 or less, alternately 0.90 or less, alternately 0.85 or less, alternately 0.80 or less, alternately 0.75 or less, alternately 0.70 or less, alternately 0.65 or less, alternately 0.60 or less, alternately 0.55 or less.

Derivatization and Further Reactions

The modified vinyl terminated polyolefins described herein may be further derivatized as described in U.S. Pat. No. 6,022,929. Any available Si—H bond can be converted to a halide; PO—Si—X by reaction with AlX$_3$ or organic RX$_4$ (PO is a polyolefin and X is a halogen, such as Cl). The PO-silanes or derivatized versions themselves may be polymerized to polysilanes; —Si(PO)—Si(PO)—Si(PO)— (see Silicon Chemistry: From the Atom to Extended Systems, Wiley-VCH, 2007). Less substituted PO—SiH$_2$— themselves may act as polyhydrosilation reagents with unsaturated molecules such as alkynes, ketones, alkenes, etc. with suitable hydrosilation catalysts as H$_2$PtCl$_6$. The PO—SiH molecules can be oxidized to PO—SiOH or PO—SiOR, R=alkyl, aryl, etc. with suitable reagents.

Blends with Ethylene Polymers

The materials described herein may be combined with at least one ethylene polymer to prepare modified polyethylene blends.

In one aspect of the invention, the ethylene polymer is selected from ethylene homopolymer, ethylene copolymers, and blends thereof. Useful copolymers may comprise one or more comonomers in addition to ethylene and can be a random copolymer, a statistical copolymer, a block copolymer, and/or blends thereof. In particular, the ethylene polymer blends described herein may be physical blends or in situ blends of more than one type of ethylene polymer or blends of ethylene polymers with polymers other than ethylene polymers where the ethylene polymer component is the majority component (e.g., greater than 50 wt %). The method of making the polyethylene is not critical, as it can be made by slurry, solution, gas phase, high pressure, or other suitable processes, and by using catalyst systems appropriate for the polymerization of polyethylenes, such as Ziegler-Natta-type catalysts, chromium catalysts, metallocene-type catalysts, other appropriate catalyst systems, or combinations thereof, or by free-radical polymerization. In a preferred embodiment, the ethylene polymers are made by the catalysts, activators and processes described in U.S. Pat. Nos. 6,342,566; 6,384,142; 5,741,563; PCT publications WO 03/040201; and WO 97/19991. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000).

Preferred ethylene polymers and copolymers that are useful in this invention include those sold by ExxonMobil Chemical Company in Houston Tex., including those sold as ExxonMobil HDPE, ExxonMobil LLDPE, and ExxonMobil LDPE; and those sold under the ENABLE™ EXACT™, EXCEED™ ESCORENE™ EXXCO™ ESCOR™ PAXON™, and OPTEMA™ tradenames.

In a preferred embodiment of the invention, the ethylene copolymers preferably have a composition distribution breadth index (CDBI) of 60% or more, preferably 60% to 80%, preferably 65% to 80%. In another preferred embodiment, the ethylene copolymer has a density of 0.910 to 0.950 g/cm$^3$ (preferably 0.915 to 0.940 g/cm$^3$, preferably 0.918 to 0.925 g/cm$^3$) and a CDBI of 60% to 80%, preferably between 65% and 80%. Preferably these polymers are metallocene polyethylenes (mPEs).

In another embodiment, the ethylene copolymer comprises one or more mPEs described in US 2007/0260016 and U.S. Pat. No. 6,476,171, e.g., copolymers of an ethylene and at least one alpha olefin having at least 5 carbon atoms obtainable by a continuous gas phase polymerization using supported catalyst of an activated molecularly discrete catalyst in the substantial absence of an aluminum alkyl based scavenger (e.g., triethylaluminum, trimethylaluminum, tri-isobutyl aluminum, tri-n-hexylaluminum, and the like), which polymer has a Melt Index of from 0.1 to 15 (ASTM D 1238, condition E); a CDBI of at least 70%, a density of from 0.910 to 0.930 g/cc; a Haze (ASTM D1003) value of less than 20; a Melt Index ratio (I21/I2, ASTMD 1238) of from 35 to 80; an averaged Modulus (M) (as defined in U.S. Pat. No. 6,255,426) of from 20,000 to 60,000 psi (13790 to 41369 N/cm$^2$); and a relation between M and the Dart Impact Strength (26 inch, ASTM D 1709) in g/mil (DIS) complying with the formula:

$$DIS \geq 0.8 \times [100 + e^{(11.71 - 0.000268 \times M + 2.183 \times 10^{-9} \times M^2)}],$$

where "e" represents 2.1783, the base Napierian logarithm, M is the averaged Modulus in psi and DIS is the 26 inch (66 cm) dart impact strength. (See U.S. Pat. No. 6,255,426 for further description of such ethylene polymers.)

In another embodiment, the ethylene polymer comprises a Ziegler-Natta polyethylene, e.g., CDBI less than 50, preferably having a density of 0.910 to 0.950 g/cm$^3$ (preferably 0.915 to 0.940 g/cm$^3$, preferably 0.918 to 0.925 g/cm$^3$).

In another embodiment, the ethylene polymer comprises olefin block copolymers as described in EP 1 716 190.

In another embodiment, the ethylene polymer is produced using chrome based catalysts, such as, for example, in U.S. Pat. No. 7,491,776 including that fluorocarbon does not have to be used in the production. Commercial examples of polymers produced by chromium include the Paxon™ grades of polyethylene produced by ExxonMobil Chemical Company, Houston Tex.

In another embodiment, the ethylene polymer comprises ethylene and an optional comonomer of propylene, butene, pentene, hexene, octene nonene or decene, and said polymer has a density of more than 0.86 to less than 0.910 g/cm$^3$, an Mw of 20,000 g/mol or more (preferably 50,000 g/mol or more) and a CDBI of 90% or more.

In another embodiment, the ethylene polymer comprises a substantially linear and linear ethylene polymers (SLEPs). Substantially linear ethylene polymers and linear ethylene polymers and their method of preparation are fully described in U.S. Pat. Nos. 5,272,236; 5,278,272; 3,645,992; 4,937,299; 4,701,432; 4,937,301; 4,935,397; 5,055,438; EP 129,368; EP 260,999; and WO 90/07526, which are fully incorporated herein by reference. As used herein, "a linear or substantially linear ethylene polymer" means a homopolymer of ethylene or a copolymer of ethylene and one or more alpha-olefin comonomers having a linear backbone (i.e., no cross linking), a specific and limited amount of long-chain branching or no long-chain branching, a narrow molecular weight distribution, a narrow composition distribution (e.g., for alpha-olefin copolymers), or a combination thereof. More explanation of such polymers is discussed in U.S. Pat. No. 6,403,692, which is incorporated herein by reference for all purposes.

Ethylene homopolymers and copolymers useful in this invention typically have:

1. an $M_w$ of 20,000 g/mol or more, 20,000 to 2,000,000 g/mol preferably 30,000 to 1,000,000, preferably 40,000 to 200,000, preferably 50,000 to 750,000, as measured by size exclusion chromatography according to the procedure described in the Test Methods section of U.S. Publication No. 2013-0211008; and/or
2. an $M_w/M_n$ of 1 to 40, preferably 1.6 to 20, more preferably 1.8 to 10, more preferably 1.8 to 4, preferably 8 to 25 as measured by size exclusion chromatography as described in the Test Methods section of U.S. Publication No. 2013-0211008; and/or
3. a $T_m$ of 30° C. to 150° C., preferably 30° C. to 140° C., preferably 50° C. to 140° C., more preferably 60° C. to 135° C. as determined by the DSC method described in the Test Methods section of U.S. Publication No. 2013-0211008; and/or
4. a crystallinity of 5% to 80%, preferably 10% to 70%, more preferably 20% to 60% (alternatively, the polyethylene may have a crystallinity of at least 30%, preferably at least 40%, alternatively at least 50%), where crystallinity is determined by the DSC method described in the Test Methods section of U.S. Publication No. 2013-0211008; and/or
5. a heat of fusion of 300 J/g or less, preferably 1 to 260 J/g, preferably 5 to 240 J/g, preferably 10 to 200 J/g as measured by the DSC method described in the Test Methods section of U.S. Publication No. 2013-0211008; and/or
6. a crystallization temperature (Tc) of 15° C. to 130° C., preferably 20° C. to 120° C., preferably 25° C. to 110° C., preferably 60° C. to 125° C., as measured by the method described in the Test Methods section of U.S. Publication No. 2013-0211008; and/or
7. a heat deflection temperature of 30° C. to 120° C., preferably 40° C. to 100° C., more preferably 50° C. to 80° C. as measured according to ASTM D648 on injection molded flexure bars, at 66 psi load (455 kPa); and/or
8. a Shore hardness (D scale) of 10 or more, preferably 20 or more, preferably 30 or more, preferably 40 or more, preferably 100 or less, preferably from 25 to 75 (as measured by ASTM D 2240); and/or
9. a percent amorphous content of at least 50%, alternatively at least 60%, alternatively at least 70%, even alternatively between 50% and 95%, or 70% or less, preferably 60% or less, preferably 50% or less, as determined by subtracting the percent crystallinity from 100 as described in the Test Methods section of U.S. Publication No. 2013-0211008; and/or
10. a branching index ($g'_{vis}$) of 0.97 or more, preferably 0.98 or more, preferably 0.99 or more, preferably 1, as measured using the method described in the Test Methods section of U.S. Publication No. 2013-0211008; and/or
11. a density of 0.860 to 0.980 g/cc (preferably from 0.880 to 0.940 g/cc, preferably from 0.900 to 0.935 g/cc, preferably from 0.910 to 0.930 g/cc) (alternately from 0.85 to 0.97 $g/cm^3$, preferably 0.86 to 0.965 $g/cm^3$, preferably 0.88 to 0.96 $g/cm^3$, alternatively between 0.860 and 0.910 $g/cm^3$, alternatively between 0.910 and 0.940 $g/cm^3$, or alternatively between 0.94 to 0.965 $g/cm^3$) (determined according to ASTM D 1505 using a density-gradient column on a compression-molded specimen that has been slowly cooled to 25° C. (i.e., over a period of 10 minutes or more) and allowed to age for a sufficient time that the density is constant within +/−0.001 $g/cm^3$).

In a preferred embodiment, the polyethylene comprises less than 20 mol % propylene units (preferably less than 15 mol %, preferably less than 10 mol %, preferably less than 5 mol %, preferably 0 mol % propylene units).

In another embodiment of the invention, the ethylene polymer is an ethylene copolymer, either random, or block, of ethylene and one or more comonomers selected from $C_3$ to $C_{20}$ α-olefins, typically from $C_3$ to $C_{10}$ α-olefins in another embodiment. Preferably, the comonomers are present from 0.1 wt % to 50 wt % of the copolymer in one embodiment, from 0.5 wt % to 30 wt % in another embodiment, from 1 wt % to 15 wt % in yet another embodiment, and from 0.1 wt % to 5 wt % in yet another embodiment, wherein a desirable copolymer comprises ethylene and $C_3$ to $C_{20}$ α-olefin derived units in any combination of any upper wt % limit with any lower wt % limit described herein. Preferably, the ethylene copolymer will have a weight average molecular weight of from greater than 8,000 g/mol in one embodiment, greater than 10,000 g/mol in another embodiment, greater than 12,000 g/mol in yet another embodiment, greater than 20,000 g/mol in yet another embodiment, less than 1,000,000 g/mol in yet another embodiment, and less than 800,000 g/mol in yet another embodiment, wherein a desirable copolymer may comprise any upper molecular weight limit with any lower molecular weight limit described herein.

In another embodiment, the ethylene copolymer comprises ethylene and one or more other monomers selected from the group consisting of $C_3$ to $C_{20}$ linear, branched or cyclic monomers, and in some embodiments is a $C_3$ to $C_{12}$ linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. The monomers may be present at up to 50 wt %, preferably from 0 wt % to 40 wt %, more preferably from 0.5 wt % to 30 wt %, more preferably from 2 wt % to 30 wt %, more preferably from 5 wt % to 20 wt %.

Preferred linear alpha-olefins useful as comonomers for the ethylene copolymers useful in this invention include $C_3$ to $C_8$ alpha-olefins, more preferably 1-butene, 1-hexene, and 1-octene, even more preferably 1-hexene. Preferred branched alpha-olefins include 4-methyl-1-pentene, 3-methyl-1-pentene, and 3,5,5-trimethyl-1-hexene, 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally, two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkyl-styrenes, vinyltoluenes, vinylnaphthalene, allyl benzene, and indene, especially styrene, paramethyl styrene, 4-phenyl-1-butene, and allyl benzene.

Preferred diolefin monomers useful in the ethylene polymer or copolymer include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes ($M_w$ less than 1000 g/mol). Preferred cyclic dienes include cyclopentadiene, vinylnorbornene, norbornadiene, ethylidene norbornene, divinylbenzene, dicyclopentadiene, or higher ring containing diolefins with or without substituents at various ring positions.

Further useful mPEs include those described in US 2007/0260016 and U.S. Pat. No. 6,476,171, e.g., copolymers of an ethylene and at least one alpha olefin having at least 5 carbon atoms obtainable by a continuous gas phase polymerization using supported catalyst of an activated molecularly discrete catalyst in the substantial absence of an aluminum alkyl based scavenger (e.g., triethylaluminum, trimethylaluminum, tri-isobutyl aluminum, tri-n-hexylaluminum, and the like), which polymer has a Melt Index of from 0.1 to 15 (ASTM D 1238, condition E); a CDBI of at least 70%; a density of from 0.910 to 0.930 g/cc; a Haze (ASTM D1003) value of less than 20; a Melt Index ratio (I21/I1, ASTMD 1238) of from 35 to 80; an averaged Modulus (M) (as defined in U.S. Pat. No. 6,255,426) of from 20,000 to 60,000 psi (13790 to 41369 N/cm$^2$); and a relation between M and the Dart Impact Strength (26 inch, ASTM D 1709) in g/mil (DIS) complying with the formula:

$$DIS \geq 0.8 \times [100 + e^{(11.71 - 0.000268 \times M + 2.183 \times 10^{-9} \times M^2)}],$$

where "e" represents 2.1783, the base Napierian logarithm, M is the averaged Modulus in psi, and DIS is the 26 inch (66 cm) dart impact strength.

Useful mPE homopolymers or copolymers may be produced using mono- or bis-cyclopentadienyl transition metal catalysts in combination with an activator of alumoxane and/or a non-coordinating anion in solution, slurry, high pressure, or gas phase. The catalyst and activator may be supported or unsupported and the cyclopentadienyl rings may be substituted or unsubstituted. Several commercial products produced with such catalyst/activator combinations are commercially available from ExxonMobil Chemical Company in Baytown, Tex. under the tradename EXCEED™ Polyethylene or ENABLE™ Polyethylene.

Applications

The modified polyolefins of this invention (and blends thereof as described above) may be used in any known thermoplastic or elastomer application. Examples include uses in molded parts, films, tapes, sheets, tubing, hose, sheeting, wire and cable coating, adhesives, shoe soles, bumpers, gaskets, bellows, films, fibers, elastic fibers, nonwovens, spun bonds, corrosion protection coatings and sealants. Preferred uses include additives for lubricants and/or fuels and in blown film applications.

EXAMPLES

Tests and Materials

Products were characterized by $^1$H NMR as follows:

$^1$H NMR data was collected at either 25° C. or 120° C. (for purposes of the claims, 120° C. shall be used) in a 5 mm probe using a Varian spectrometer with a proton frequency of at least 400 MHz or a Bruker 500 MHz. Data was recorded using a maximum pulse width of 45°, 8 seconds between pulses and signal averaging 120 transients. Spectral signals were integrated and the number of unsaturation types per 1000 carbons was calculated by multiplying the different groups by 1000 and dividing the result by the total number of carbons. $M_n$ of the macromer is determined by $^1$H NMR spectroscopy by comparison of integrals of the aliphatic region to the olefin region as determined using the protocol described in the Experimental section of U.S. Pat. No. 8,372,930.

GPC conditions are those described above.

1% Secant Modulus (M), reported in pounds per square inch (psi), was measured as specified by ASTM D-882.

Yield strength and tensile strength, report as pounds per square inch (psi), were measured as specified by ASTM D-882 except that the gauge thickness, reported in mils, was measured using a HEIDENHAIN micrometer. For each film sample, twenty random film thickness data points were measured around the circumference of the bubble. From these measurements, an average gauge measurement was determined and reported.

Elongation at Yield and Elongation at Break, reported as a percentage (%), were measured as specified by ASTM D-882.

Elmendorf Tear, reported in grams (g) or grams per mil (g/mil), was measured as specified by ASTM D-1922. Verification of scale was done using the check weight method.

Haze, reported as a percentage (%), was measured as specified by ASTM D-1003, using procedure A. Internal haze refers to the inherent haze level of the film or molded article, excluding any surface-related contribution. The surface(s) is coated with an ASTM-approved inert liquid (Immersion Oil Type B, typically used for microscopy) to eliminate any contribution to haze from surface topology effects. The resulting haze value is termed internal haze, and is reported as a percentage (%). Haze measurements that include surface topology effects are referred to as total haze. Unless particularly specified, the haze levels reported here are total haze values.

Dart Drop Impact or Dart Drop Impact Strength (DIS), reported in grams (g) and/or grams per mil (g/mil), was measured as specified by ASTM D-1709, method A, unless otherwise specified.

Polyolefins

The commercially available polyolefins used in the Examples are as described below in Table 1.

TABLE 1

COMMERCIAL POLYOLEFINS

| Polyolefins | Source | Description |
|---|---|---|
| PAXON™ AL55-003 | ExxonMobil Chemicals (Houston, Texas) | High density polyethylene; MI = 0.3 g/10 min; density = 0.954 g/cm$^3$ $M_n$ = 17,000 >95% vinyl chain ends |
| EXCEED™ 1018CA | ExxonMobil Chemicals (Houston, Texas) | Ethylene-based polymer; hexene comonomer; MI = 1.0 g/10 min; density = 0.918 g/cm$^3$ |
| EXCEED™ 2018CA | ExxonMobil Chemicals (Houston, Texas) | Ethylene-hexene copolymer; metallocene-produced; |

TABLE 1-continued

COMMERCIAL POLYOLEFINS

| Polyolefins | Source | Description |
|---|---|---|
| | | MI = 2.0 g/10 min; density = 0.918 g/cm³ |

The commercially available polysiloxanes used in the Examples are as described below in Table 2.

TABLE 2

COMMERCIAL POLYSILOXANES

| Polysiloxane | Source | Description |
|---|---|---|
| Polyphenyl(dimethylhydrosiloxy)siloxane, hydride terminated (PPDMHS) 50-80 cSt | Gelest Inc. (Morrisville, PA) | 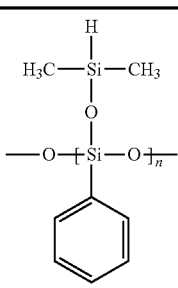 |
| Polymethylhydrosiloxane, trimethyl silyl terminated (PHMS) 30-45 cSt | Gelest Inc. (Morrisville, PA) | 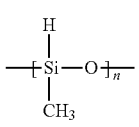 |

General Procedure for Hydrosilylation

Vinyl terminated polymers, inclusive of polyalphaolefins and vinyl terminated macromonomers, were modified with various polysiloxane backbones. Reactions were carried out in the melt in a BRABENDER™ extruder. The BRABENDER™ extruder was connected to a nitrogen gas inlet through which a continuous stream of nitrogen gas flowed. The catalyst was added by syringe once the torque stabilized. The silane was added, about 1 minute later. The torque dropped initially and then rose to a point where it leveled, generally after 1 to 30 minutes. The modified polyolefin was then removed from the BRABENDER™ extruder and used without further modification.

General Procedure for Modified Polyolefins Blends

Viscosity matching when blending these hydrosilylated polymers with lower density LLDPE materials was of interest. Blends were prepared (between 10% to 50% vinyl terminated HDPE was blended with a base resin). Additives were used in all samples, except where the base resin already comprises an additive package. Where additional additives were used, the additive package was composed of 500 ppm IRGANOX™ 1076 and 1000 ppm IRGAFOS™ 168.

Films

The modified polyolefin may be blended with base resin materials, and the blend made into films (both compression molded and blown films).

The modified polyolefin material was formed into sheets via conventional compression molding techniques. 100 mm×100 mm×2 mm pads were formed using the following conditions: 5 minutes preheat at ambient pressure at 190° C., followed by a 20 minute press cycle at 5 tons (4,535 kg) pressure and finally a 180 second press cycle at 10 tons (9,072 kg) pressure. The pressure was removed and the sample was cooled to 25° C. over 5 minutes.

Blown films were prepared using a laboratory Haake blown film line. The line contained a 1" single screw extruder and a 1" mono-layer blown film die. The films produced had a 1.5 mil gauge and a 2.8 bubble blow-up ratio (BUR). "MD" refers to machine direction and "TD" refers to transverse direction.

Chromium catalyzed high density polyethylene (PAXON™ AL55-003), which has over 95% vinyl terminated chains, was modified with various polysiloxane modifiers.

Example 1 (Inventive)

Hydrosilylation of PAXON™ AL55-003 Polyethylene with PPDMHS

PAXON™ AL55-003 polyethylene (50 g) was fed into the BRABENDER™ extruder set at 150° C. After 9 minutes, once the torque stabilized, a platinum cyclovinylmethylsiloxane complex catalyst (Gelest Inc., Morrisville, Pa., 2.0-2.3% platinum concentration in cyclic methylvinylsiloxanes, 0.04 mL) was added by syringe. Hydride terminated polyphenyl-(dimethylhydrosiloxy)siloxane (PPDMHS, 0.9 mL) was then added 1 minute later. The resulting mixture was melt mixed at 40 rpm for an additional 10 minutes. The modified polyolefin was blended for 5 minutes further before removal to produce Example 1 modified polyolefin. FTIR showed suppression of the Si—H peak at 2170 cm$^{-1}$ once the reaction was completed as this Si—H bond is converted to Si—C bonds during reaction. Example 1 modified polyolefin was made into a compression molded film.

Upon inspection, the compression molded films made from Example 1 modified polyolefin showed no gel particles. A polyolefin film having gels present can have reduced physical properties and be visually unacceptable for the product application. Therefore, it is highly desirable to reduce or eliminate gel formation during processing. The hydrosilylated (PPDMHS) PAXON™ polyethylene (Example 1) advantageously did not exhibit any gels.

Example 2 (Comparative)

Modified (PHMS) Polyethylene Blends

PAXON™ AL55-003 polyethylene (5 g) was dry blended with EXCEED™ 1018 CA polyethylene pellets (45 g). The blend was fed into a BRABENDER™ extruder set to a temperature of 150° C. After 9 minutes, once the torque stabilized, the platinum cyclovinylmethylsiloxane complex catalyst was added by syringe (0.04 mL). Polyhydromethylsiloxane (PHMS, 0.06 mL) was then added 1 minute later. The resulting mixture was melt mixed at 40 rpm for 15 minutes further to provide a 10% blend in EXCEED™ 1018 CA polyethylene.

The Example 210% blend in EXCEED™ 1018 CA polyethylene demonstrated extensional strain hardening (FIG. 1) which provided improved bubble stability during blown film operations.

The rheological data were analyzed using the Van Gurp-Palmen treatment (reference: M. Van Gurp and J. Palmen, Rheology Bulletin, 67, 5, 1998), whereby the phase angle δ (=tan⁻¹ (G"/G')) is plotted against the absolute value of the complex modulus |G*|=(G'²+G"²)^½. This representation of linear viscoelastic data is a powerful means of characterizing molecular and structural features of polymers. For example, low levels of long chain branching in polyolefins can be detected and quantified on a relative basis, using this methodology. For Example 2, rheological changes were observed in the Van Gurp-Palmen plot (FIG. 2) and there was an increase in zero-shear viscosity on addition of the reactive PHMS with catalyst (FIG. 3).

Examples 3-6 (Inventive)

Modified Polyethylene Blends

The modified polyolefin blends for Examples 3 through 6 were prepared as follows. PAXON™ AL55-003 polyethylene was treated with PPDMHS as described above in Example 1 to produce the modified PAXON™ polyethylene. The amount of PPDMHS was varied from a mole to mole ratio of 8:1, 4:1, 2:1, and 1:1 for Examples 3, 4, 5, and 6, respectively, based on the calculated moles of reactive end groups of the PAXON™ AL55-003. The modified PAXON™ AL55-003 polyethylene (3 wt %) was then dry blended with EXCEED™ 2018 polyethylene to provide Example 3 through 6 blends. Blown films were prepared, as described above, using a laboratory HAAKE blown film line.

Example C (Comparative)

No Modified Polyethylene

Control Example C was EXCEED™ 2018 without the addition of the modified PAXON™ AL55-003 polyethylene. A blown film was prepared, as described above, for comparison to the inventive films.

TABLE 3

BLOWN FILMS MADE FROM EXAMPLES 3-6

|  | Sample C (CONTROL) | Example 3 | Example 4 | Example 5 | Example 6 |
|---|---|---|---|---|---|
| Ratio of PPDMHS:PAXON ™ in Modified PAXON ™ PE | — | 8:1 | 4:1 | 2:1 | 1:1 |
| Film Properties | | | | | |
| 1% Secant | | | | | |
| MD (psi) | 23,332 | 26,558 | 29,061 | 28,915 | 29,186 |
| MD (MPa) | 160.8 | 183.1 | 200.3 | 199.3 | 201.2 |
| Tensile Yield Strength | | | | | |
| MD (psi) | 1,293 | 1,401 | 1,294 | 1,355 | 1,395 |
| TD (psi) | 1,349 | 1,325 | 1,414 | 1,334 | 1,412 |
| MD (MPa) | 8.9 | 9.7 | 8.9 | 9.3 | 9.6 |
| TD (MPa) | 9.3 | 9.1 | 9.7 | 9.2 | 9.7 |
| Elongation @ Yield (%) | | | | | |
| MD | 7.5 | 6.8 | 5.9 | 5.8 | 6.4 |
| TD | 6.1 | 6.4 | 5.7 | 5.5 | 6.5 |
| Tensile Strength | | | | | |
| MD (psi) | 7,070 | 7,436 | 6,876 | 6,929 | 7,306 |
| TD (psi) | 7,339 | 6,667 | 7,433 | 6,210 | 7,113 |
| MD (kPa) | 48.7 | 51.2 | 47.4 | 47.7 | 50.4 |
| TD (kPa) | 50.6 | 45.9 | 51.2 | 42.8 | 49.0 |
| Elongation @ Break (%) | | | | | |
| MD | 632 | 651 | 655 | 642 | |
| TD | 624 | 652 | 668 | 593 | 651 |
| Elmendorf Tear | | | | | |
| MD (g) | 350 | 344 | 318 | 316 | 344 |
| TD (g) | 432 | 481 | 561 | 519 | 322 |
| MD (g/mil) | 343 | 331 | 307 | 326 | 489 |
| TD (g/mil) | 415 | 428 | 449 | 453 | 450 |
| MD (g/µm) | 13.5 | 13.0 | 12.0 | 12.8 | 19.2 |
| TD (g/µm) | 16.3 | 16.8 | 17.6 | 17.8 | 17.6 |
| Haze (%) | 61.7* | 13.1 | 13.7 | 12.9 | 10.7 |
| Internal Haze (%) | 4.3 | 2.1 | 2.2 | 2.1 | 1.5 |
| Dart Drop, Method A | | | | | |
| (g) | 371 | 236 | 227 | 212 | 222 |
| (g/mil) | 294 | 207 | 185 | 178 | 183 |
| Gauge Mic | | | | | |
| Average (mils) | 1.26 | 1.14 | 1.23 | 1.19 | 1.21 |
| Low (mils) | 0.87 | 0.86 | 1.00 | 0.92 | 0.91 |
| High (mils) | 1.60 | 1.37 | 1.41 | 1.55 | 1.53 |
| Average (mils) | 32.0 | 29.0 | 31.2 | 30.2 | 30.7 |
| Low (µm) | 22.0 | 21.8 | 25.4 | 23.4 | 24.6 |
| High (µm) | 40.6 | 34.7 | 35.8 | 39.4 | 38.9 |
| Die Melt Temperature (° C.) | 165 | 164 | 164 | 164 | 165 |
| Torque (m.g) | 45.6 | 38.9 | 41.9 | 38.6 | 43.9 |
| Extruder Speed (rpm) | 33.0 | 33.0 | 33.0 | 34.0 | 34.0 |
| Head Pressure (psi) | 2963.8 | 2946.4 | 2920.3 | 2937.7 | 2982.6 |

TABLE 3-continued

BLOWN FILMS MADE FROM EXAMPLES 3-6

| | Sample C (CONTROL) | Example 3 | Example 4 | Example 5 | Example 6 |
|---|---|---|---|---|---|
| Head Pressure (kPa) | 20,435 | 20,315 | 20,135 | 20,255 | 20,564 |
| Frost Line Height (inches) | 2.5 | 2.5 | 2.5 | 2.5 | 2.5 |
| Frost Line Height (m) | 0.064 | 0.064 | 0.064 | 0.064 | 0.064 |
| Output (g/min) | 15.5 | 15.2 | 15.2 | 15.5 | 15.5 |

*Due in part to gels.

It was noted that blended Examples 3 through 6 exhibited a decrease in torque as compared to control Sample C. The decrease in torque reduces motor load and allows for the material to be processed using lower energy, or can also give higher throughputs for the same motor loads.

An increase in tensile strength was observed for Examples 3 through 6, compared with the control Sample C. The increase in tensile strength advantageously increases stiffness and load carrying ability for the polymers.

Also, dart drop was reduced in Examples 3 through 6 when compared to control sample C. The decrease in dart drop may be due to the increased orientation in the film. This generally is the consequence of adding high density material to LLDPE. Not to be limited by theory, it is believed that this can be mitigated by adding in a lower density PE.

Example 7 (Inventive)

Vinyl Terminated Macromonomers

The vinyl-terminated macromonomers were prepared according to procedures described in U.S. Application Ser. No. 61/704,606, filed on Sep. 24, 2012; and U.S. Application Ser. No. 61/704,604, filed on Sep. 24, 2012.

Metallocene A, represented by the following structure was used herein:

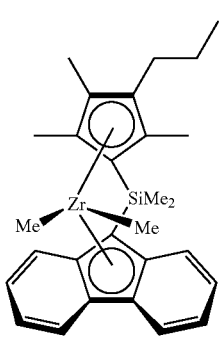

Dimethylaniliniumtetrakis(perfluoronaphthyl)borate was used as the activator.

To a clean and dry standard 2 liter autoclave, hexene and TIBAL (triisobutylalumoxane) in toluene was added using a cannula. Hexanes were added from a storage tank. The autoclave was then sealed. The reactor was then heated to the set temperature and the agitator started. Once the temperature and pressure were stable, the metallocene A/dimethylaniliniumtetrakis(perfluoronaphthyl)borate (previously prepared in a dry box) was flushed into the system using 200 ml hexanes.

At this point, ethylene gas was introduced and the inlet was left open so that a constant pressure of ethylene was maintained. The approximate polymer yield was followed by monitoring the flow rate of ethylene to the reactor (to replenish the used ethylene). After about 20 minutes, the reactor was cooled to 25° C., depressurized, and the reactor opened to retrieve the polymer. The polymer was dried in a hood for 12 hours to remove residual hexanes and weighed to determine the overall yield. By this procedure, 4 different batches were prepared. The run conditions are shown below, in Table 4.

TABLE 4

RUN CONDITIONS TO PREPARE VINYL TERMINATED MACROMONOMER

| Run | Catalyst (mg) | Activator (mg) | 25% TIBAL in toluene (mL) | Hexene (mL) | Initial Hexanes (mL) |
|---|---|---|---|---|---|
| 1 | 5 | 12.2 | 2 | 40 | 400 |
| 2 | 5 | 12.2 | 2 | 40 | 400 |
| 3 | 5 | 12.2 | 2 | 40 | 400 |
| 4 | 5 | 12.2 | 2 | 40 | 400 |

Because the molecular weights and thermal characteristics of polymer obtained from Runs 1 to 4 were similar, the polymer from these four runs were dry blended together to obtain a single polymer batch (VTM polymer), which was blended in at 3% by weight in EXCEED™ 2018 polyethylene to produce Example 7 polymer.

VTM polymer (50 g, 60% vinyl chain ends, 1.67 mmol) was fed into a BRABENDER™ extruder set to a temperature of 190° C. After 9 minutes, once the torque stabilized, PPDMHS (0.50 mL, 3.37 mmol, 2.02:1 Si—H:vinyl ratio) was added by syringe. The platinum cyclovinylmethylsiloxane complex catalyst (40 mg) was then added 5 minutes later. The resulting mixture was melt mixed at 40 rpm for 10 minutes further and then the additive package was added and mixed for an additional 5 minutes. This PPDMHS-modified VTM polymer was blended at 3% by weight in EXCEED™ 2018 polyethylene to produce Example 8.

Blown films were prepared, as described above, for Examples 7 and 8 polymers using a laboratory HAAKE blown film line. Control Example C2 was EXCEED™ 2018 without the addition of the VTM polymer (either modified or unmodified). A blown film was prepared, as described above, for comparison to the inventive films.

The film properties are shown in Table 5, below.

TABLE 5

BLOWN FILMS MADE FROM EXAMPLES 7-8

| | Sample C2 (CONTROL) | Example 7 | Example 8 |
|---|---|---|---|
| Ratio of PPDMHS:PAXON™ in Modified PAXON™ PE | — | 2:1 | 2:1 |

TABLE 5-continued

BLOWN FILMS MADE FROM EXAMPLES 7-8

| | Sample C2 (CONTROL) | Example 7 | Example 8 |
|---|---|---|---|
| Elmendorf Tear | | | |
| MD (g) | 461.1 | 467.8 | 418.6 |
| TD (g) | 586.2 | 616.3 | 625.9 |
| MD (g/mil) | 327.3 | 343.4 | 278.1 |
| TD (g/mil) | 413.0 | 440.4 | 409.5 |
| MD (g/μm) | 12.9 | 13.5 | 10.9 |
| TD (g/μm) | 16.3 | 17.3 | 16.1 |
| Gauge Mic (MD) (mils) | 1.41 | 1.36 | 1.55 |
| Gauge Mic (TD) (mils) | 1.42 | 1.40 | 1.53 |
| Dart Drop, Method A | | | |
| (g) | 304 | 267.0 | 300.5 |
| (g/mil) | 201.3 | 177.4 | 176.8 |
| Gauge Mic (Avg) (mils) | 1.51 | 1.51 | 1.7 |

Example 7 and 8 films had greater bubble stability than the control (C2) film. They also had no gels, in contrast to the control. Advantageously, the film properties remained the same, and the rheology of the blends showed greater zero-shear viscosity than the control (C2) resin.

All documents described herein are incorporated by reference herein for purposes of all jurisdictions where such practice is allowed, including any priority documents, related applications and/or testing procedures to the extent they are not inconsistent with this text, provided however that any priority document not named in the initially filed application or filing documents is not incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A process to prepare a modified polyolefin comprising the steps of:
   (i) contacting a non-metallocene catalyst, a hydrosilylation modifier, and one or more vinyl terminated polyolefins selected from a vinyl terminated polyalphaolefin and a vinyl terminated macromonomer;
   wherein when the vinyl terminated polyolefin is a vinyl terminated macromonomer, the hydrosilylation modifier is represented by one of more of the formulae:

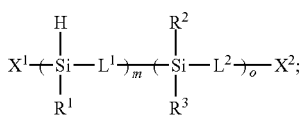

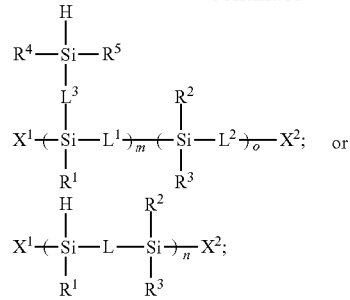

and
   wherein when the vinyl terminated polyolefin is a vinyl terminated polyalphaolefin, the hydrosilylation modifier is represented by the formula:

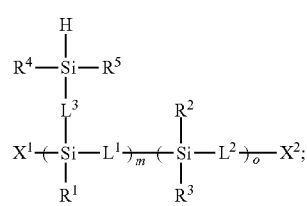

wherein $R^1$ is hydrogen, Z', or a $C_1$ to a $C_{20}$ substituted or unsubstituted hydrocarbyl group; and wherein Z' is a group represented by the formula:

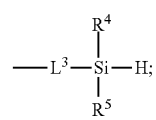

each $R^2$, $R^3$, $R^4$, and $R^5$, independently, is a H, or a $C_1$ to a $C_{20}$ substituted or unsubstituted hydrocarbyl group, where $R^2$ and $R^3$ and/or $R^4$ and $R^5$ may form a cyclic structure with Si;
   each L, $L^1$, $L^2$, and $L^3$, independently, is a bond or a linking group;
   m is 1 to 1000;
   n is 1 to 1000;
   o is 0 to 1000;
   each of $X^1$ and $X^2$, independently, is hydrogen or a $C_1$ to a $C_{20}$ substituted or unsubstituted hydrocarbyl group;
   wherein the vinyl terminated polyolefin is a substituted or unsubstituted hydrocarbyl group having from 20 to about 10,000 carbon atoms and at least 5% allyl chain ends; and
   (ii) obtaining a modified polyolefin;
   (iii) adding a polymer; and
   (iv) obtaining a blend comprising the modified polyolefin;
   wherein the amount of modified polyolefin is from about 0.5 wt % to about 10 wt %, based on the total weight of the blend.

2. The process of claim 1, wherein the polymer from step (iii) is added during step (i).

3. The process of claim 1, wherein the vinyl terminated macromonomer has the following properties:
   a Mn of at least 200 g/mol, measured by $^1$H NMR, comprising of one or more $C_4$ to $C_{40}$ higher olefin derived units, where the higher olefin polymer comprises substantially no propylene derived units; and wherein the higher olefin polymer has at least 5% allyl chain ends.

4. The process of claim 1, wherein each $L^1$, $L^2$, and $L^3$, independently, is O, S, $NR^A$, $PR^B$, $SiR^C_2$, or a $C_1$ to a $C_{20}$ substituted or unsubstituted hydrocarbyl group;
wherein each $R^A$, $R^B$, and $R^C$, independently, is hydrogen, or a $C_1$ to a $C_{20}$ substituted or unsubstituted hydrocarbyl group.

5. The process of claim 1, wherein each $L^1$, $L^2$, and $L^3$, independently, is O.

6. The process of claim 1, wherein the process is carried out in the melt phase.

7. The process of claim 1, wherein the non-metallocene catalyst is one or more of: chloroplatinic acid, platinum complexes, rhodium complexes, peroxides, Ziegler Natta catalysts, and iridium, cobalt, ruthenium, osmium, nickel, and palladium complexes.

8. The process of claim 1, wherein the vinyl terminated polyalphaolefin of step (i) is ethylene-based.

9. The process of claim 8, wherein the vinyl terminated ethylene-based polyalphaolefin is made using a metallocene catalyst system comprising an ionizing activator and a metallocene compound represented by the following structure:

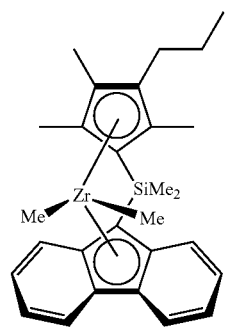

10. The process of claim 9, wherein the ionizing activator is dimethylaniliniumtetrakis(perfluoronaphthyl)borate.

11. The process of claim 1, wherein the vinyl terminated polyalphaolefin of step (i) is vinyl terminated polyethylene.

* * * * *